US011869476B2

(12) United States Patent
Hoffberg

(10) Patent No.: US 11,869,476 B2
(45) **Date of Patent: *Jan. 9, 2024**

(54) ACOUSTIC METAMATERIAL

(71) Applicant: The Research Foundation for The State University of New York, Binghamton, NY (US)

(72) Inventor: Steven M. Hoffberg, West Harrison, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,462

(22) Filed: Apr. 19, 2022

(65) Prior Publication Data

US 2022/0293078 A1 Sep. 15, 2022

Related U.S. Application Data

(62) Division of application No. 15/837,952, filed on Dec. 11, 2017, now Pat. No. 10,573,291.

(Continued)

(51) Int. Cl.
*G10K 11/178* (2006.01)
*G10K 15/04* (2006.01)

(Continued)

(52) U.S. Cl.
CPC .......... *G10K 11/1785* (2018.01); *G10K 11/18* (2013.01); *G10K 15/04* (2013.01);

(Continued)

(58) Field of Classification Search
CPC .. G10K 11/178; G10K 11/1785; G10K 11/18; G10K 11/162; G10K 15/04;

(Continued)

(56) References Cited

U.S. PATENT DOCUMENTS

2011/0033062 A1* 2/2011 Deng ........................ H04R 1/38 381/92
2012/0230641 A1* 9/2012 Donlagic ............... G02B 6/264 385/127

(Continued)

OTHER PUBLICATIONS

Rottenberg et al, "Engineering of Acoustic Metamaterials with Application to MEMS BAW Resonators", 2011 16th International Solid-State Sensors, Actuators and Microsystems Conference, Jun. 5-9, 2011, IEEE Xplore, Aug. 1, 2011, pp. 930-933 (Year: 2011).*

(Continued)

*Primary Examiner* — Leshui Zhang
(74) *Attorney, Agent, or Firm* — Hofberg & Associates; Steven M. Hoffberg

(57) ABSTRACT

A metamaterial comprising, a plurality of acoustic vector field sensors, each configured to sense an acoustic vector field of a fluid within a fluid-filled space in response to fluid waves, and producing an electrical signal corresponding to the sensed acoustic vector field; a processor configured to perform a time and space transform on the electrical signal; and at least one phased array transducer, configured to emit fluid waves according to a produced acoustic vector field pattern dependent on a result of the time and space transform, a within a portion of the fluid.

21 Claims, 11 Drawing Sheets

Related U.S. Application Data

(60) Provisional application No. 62/432,075, filed on Dec. 9, 2016.

(51) Int. Cl.
*H04K 3/00* (2006.01)
*G10K 11/18* (2006.01)

(52) U.S. Cl.
CPC ....... *H04K 3/00* (2013.01); *G10K 2210/3044* (2013.01); *H04K 3/65* (2013.01); *H04K 3/68* (2013.01); *H04K 3/82* (2013.01); *H04K 3/825* (2013.01); *H04K 3/84* (2013.01); *H04K 2203/12* (2013.01)

(58) Field of Classification Search
CPC .... G10K 2210/3044; H04K 3/00; H04K 3/65; H04K 3/68; H04K 3/82; H04K 3/825; H04K 3/84; H04K 2203/12; H04R 9/025; H04R 1/08; H04R 1/406; H04R 23/008; H04R 3/005; G11B 20/00992; G01D 5/2412; G01P 5/26; G01S 3/8034; G01H 9/00; G01H 9/004; G10H 1/00; G06F 30/20; A61B 5/0507
USPC ..... 381/71.7, 59, 56, 58, 13, 14, 61, 63, 66, 381/64, 71.11, 71.12, 71.4, 71, 3, 89, 381/332, 111, 116, 117, 119, 120, 122; 704/226, 227, 228, 231, 233, 234, 235, 704/236, 238, 39, 240, 243, 244, 247, 704/272, 270, 275, 276; 700/94
See application file for complete search history.

(56) References Cited

U.S. PATENT DOCUMENTS

| | | | | |
|---|---|---|---|---|
| 2016/0044417 | A1* | 2/2016 | Clemen, Jr. ............ | G10K 15/10 381/152 |
| 2017/0316772 | A1* | 11/2017 | Park ..................... | G10K 11/172 |
| 2018/0102122 | A1* | 4/2018 | Mondain-Monval ........................ | G10K 11/172 |
| 2019/0333495 | A1* | 10/2019 | Lee ........................ | G10K 11/22 |

OTHER PUBLICATIONS

Chen et al "Metamaterials-based enhanced energy harvesting", Physics B, Condensed Matter, 438, pp. 1-8 (Year: 2014).*
Lucklum et al "Multidimensional Metamaterial Fluid Sensor", The 17th International Conference on Solid-State Sensors, Actuators and Microsystems, IEEE Xplore, pp. 1739-1742 (Year: 2013).*

* cited by examiner providing a plurality of acoustic vector field sensors, each configured to sense an acoustic vector field of a fluid within a fluid-filled space in response to fluid waves, and producing an electrical signal corresponding to the sensed acoustic vector field;

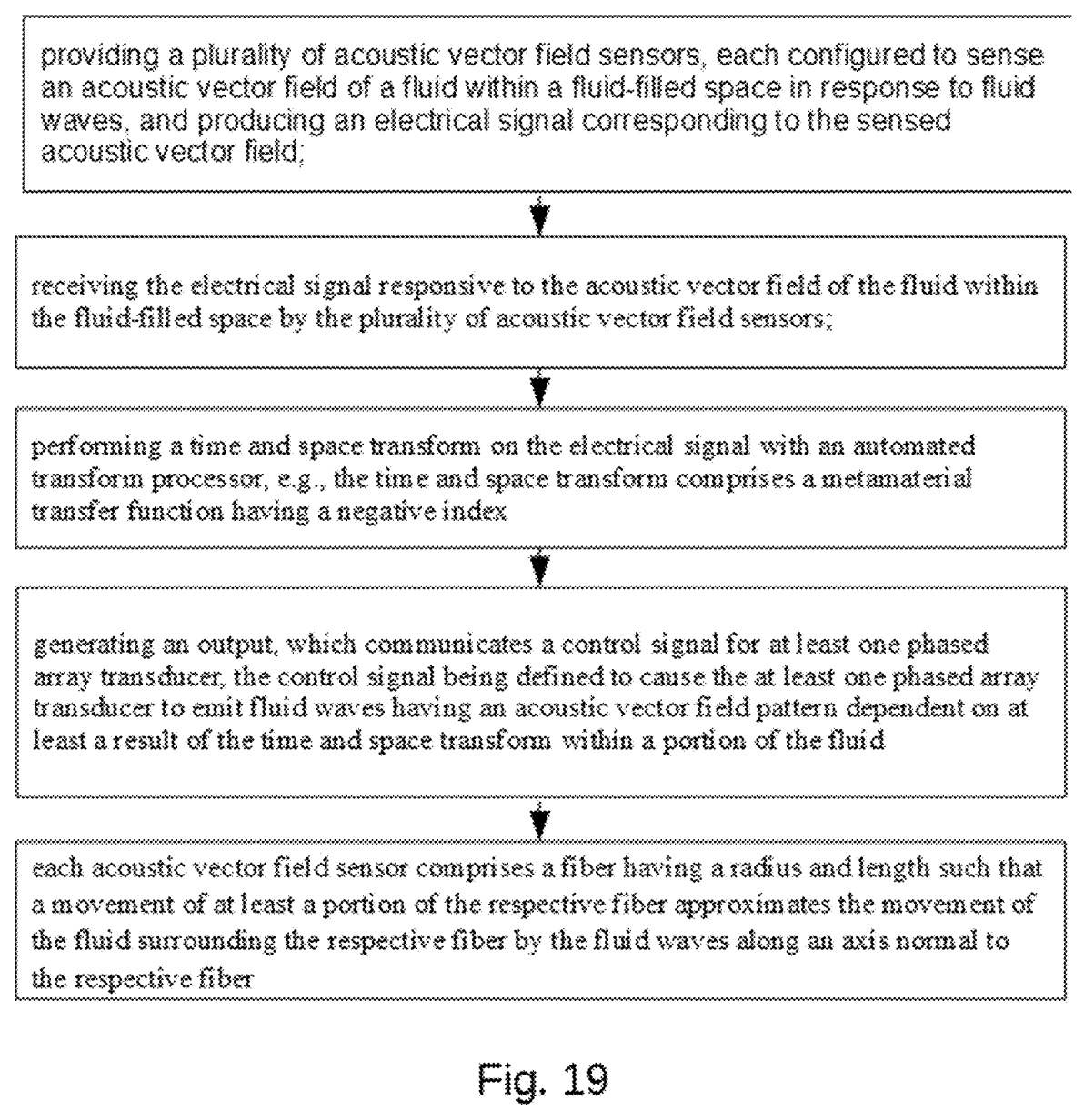

↓ receiving the electrical signal responsive to the acoustic vector field of the fluid within the fluid-filled space by the plurality of acoustic vector field sensors;

↓ performing a time and space transform on the electrical signal with an automated transform processor, e.g., the time and space transform comprises a metamaterial transfer function having a negative index

↓ generating an output, which communicates a control signal for at least one phased array transducer, the control signal being defined to cause the at least one phased array transducer to emit fluid waves having an acoustic vector field pattern dependent on at least a result of the time and space transform within a portion of the fluid

↓ each acoustic vector field sensor comprises a fiber having a radius and length such that a movement of at least a portion of the respective fiber approximates the movement of the fluid surrounding the respective fiber by the fluid waves along an axis normal to the respective fiber

Fig. 19

ACOUSTIC METAMATERIAL

CROSS REFERENCE TO RELATED APPLICATIONS

The present application is a

Continuation of U.S. patent application Ser. No. 16/799,682, filed Feb. 24, 2020, now U.S. Pat. No. 11,308,931, issued Apr. 19, 2022, which is a Division of U.S. patent application Ser. No. 15/837,952, filed Dec. 11, 2017, now U.S. Pat. No. 10,573,291, issued Feb. 25, 2020, which is a Non-provisional of, and claims benefit of priority from U.S. Provisional Patent Application No. 62/432,075, filed Dec. 9, 2016, the entirety of which are each expressly incorporated herein by reference.

FIELD OF THE INVENTION

The present invention relates to the field of fiber microphones which respond to acoustic waves by a viscous drag process.

BACKGROUND OF THE INVENTION

An acoustic metamaterial is a material designed to control, direct, and manipulate sound waves as these might occur in gases, liquids, and solids. Acoustic metamaterials permit controlling sonic waves in the negative refraction domain. See, en.wikipedia.org/wiki/Acoustic_metamaterial, expressly incorporated herein by reference.

Control of the various forms of sound waves is mostly accomplished through the bulk modulus β, mass density ρ, and chirality. The density and bulk modulus are analogies of the electromagnetic parameters, permittivity and permeability in negative index materials. Related to this is the mechanics of wave propagation in a lattice structure. Also, materials have mass, and intrinsic degrees of stiffness. Together these form a resonant system, and the mechanical (sonic) resonance may be excited by appropriate sonic frequencies (for example pulses at audio frequencies). Guenneau, Sébastien; Alexander Movchan; Gunnar Pétursson; S. Anantha Ramakrishna (2007). "Acoustic metamaterials for sound focusing and confinement". New Journal of Physics. 9 (399): 1367-2630. Bibcode:2007NJPh.9.399G. doi:10.1088/1367-2630/9/11/399.

An acoustic cloak is a device that would make objects impervious towards sound waves. This could be used to build sound proof homes, advanced concert halls, or stealth warships. The idea of acoustic cloaking is to deviate the sounds waves around the object that has to be cloaked. But realizing it in materials has been difficult, since mechanical metamaterials are needed. Making a metamaterial for sound means identifying the acoustic analogues to permittivity and permeability in light waves. It turns out that these are the material's mass density and its elastic constant. An acoustic cloak could have many applications. Walls of the material could be built to soundproof houses or it could be used in concert halls to enhance acoustics or direct noise away from certain areas. The military may also be interested to conceal submarines from detection by sonar or to create a new class of stealth ships.

See, each of which is expressly incorporated herein by reference:

Ambati, Muralidhar, et al. "Surface resonant states and superlensing in acoustic metamaterials." Physical Review B 75.19 (2007): 195447.

Ao, Xianyu, and C. T. Chan. "Far-field image magnification for acoustic waves using anisotropic acoustic metamaterials." Physical Review E 77.2 (2008): 025601.

Baz, A. "The structure of an active acoustic metamaterial with tunable effective density." New Journal of Physics 11.12 (2009): 123010.

Chen, Huanyang, and C. T. Chan. "Acoustic cloaking in three dimensions using acoustic metamaterials." Applied physics letters 91.18 (2007): 183518.

Cheng, Ying, and Xiao Jun Liu. "Three dimensional multilayered acoustic cloak with homogeneous isotropic materials." Applied Physics A 94.1 (2009): 25-30.

Cheng, Ying, et al. "A multilayer structured acoustic cloak with homogeneous isotropic materials." Applied Physics Letters 92.15 (2008): 151913.

Craster, Richard V., and Sébastien Guenneau, eds. Acoustic metamaterials: negative refraction, imaging, lensing and cloaking. Vol. 166. Springer Science & Business Media, 2012.

Cummer, Steven A., and David Schurig. "One path to acoustic cloaking." New Journal of Physics 9.3 (2007): 45.

Farhat, Mohamed, et al. "Broadband cylindrical acoustic cloak for linear surface waves in a fluid." Physical review letters 101.13 (2008): 134501.

Fokin, Vladimir, et al. "Method for retrieving effective properties of locally resonant acoustic metamaterials." Physical review B 76.14 (2007): 144302.

García-Chocano, Victor Manuel, et al. "Acoustic cloak for airborne sound by inverse design." Applied Physics Letters 99.7 (2011): 074102.

Hu, Jin, Xiaoming Zhou, and Gengkai Hu. "A numerical method for designing acoustic cloak with arbitrary shapes." Computational Materials Science 46.3 (2009): 708-712.

Hu, Xinhua, et al. "Homogenization of acoustic metamaterials of Helmholtz resonators in fluid." Physical Review B 77.17 (2008): 172301.

Huang, G. L., and C. T. Sun. "Band gaps in a multiresonator acoustic metamaterial." Journal of Vibration and Acoustics 132.3 (2010): 031003.

Lee, Sam Hyeon, et al. "Acoustic metamaterial with negative modulus." Journal of Physics: Condensed Matter 21.17 (2009): 175704.

Li, Jensen, and C. T. Chan. "Double-negative acoustic metamaterial." Physical Review E 70.5 (2004): 055602.

Liang, Zixian, and Jensen Li. "Extreme acoustic metamaterial by coiling up space." Physical review letters 108.11 (2012): 114301.

Norris, Andrew N. "Acoustic cloaking theory." Proceedings of the Royal Society of London A: Mathematical, Physical and Engineering Sciences. Vol. 464. No. 2097. The Royal Society, 2008.

Park, Choon Mahn, et al. "Amplification of acoustic evanescent waves using metamaterial slabs." Physical review letters 107.19 (2011): 194301.

Pendry, J. B., and Jensen Li. "An acoustic metafluid: realizing a broadband acoustic cloak." New Journal of Physics 10.11 (2008): 115032.

Popa, Bogdan-Ioan, and Steven A. Cummer. "Homogeneous and compact acoustic ground cloaks." Physical Review B 83.22 (2011): 224304.

Popa, Bogdan-Ioan, Lucian Zigoneanu, and Steven A. Cummer. "Experimental acoustic ground cloak in air." Physical review letters 106.25 (2011): 253901.

Shen, Chen, et al. "Anisotropic complementary acoustic metamaterial for canceling out aberrating layers." Physical Review X 4.4 (2014): 041033.

Shen, Huijie, et al. "Acoustic cloak/anti-cloak device with realizable passive/active metamaterials." Journal of Physics D: Applied Physics 45.28 (2012): 285401.

Torrent, Daniel, and Jose Sanchez-Dehesa. "Acoustic cloaking in two dimensions: a feasible approach." New Journal of Physics 10.6 (2008): 063015.

Torrent, Daniel, and Jose Sanchez-Dehesa. "Acoustic metamaterials for new two-dimensional sonic devices." New journal of physics 9.9 (2007): 323.

Urzhumov, Yaroslav, et al. "Acoustic cloaking transformations from attainable material properties." New Journal of Physics 12.7 (2010): 073014.

Wang, Pal, et al. "Harnessing buckling to design tunable locally resonant acoustic metamaterials." Physical review letters 113.1 (2014): 014301.

Xie, Yangbo, et al. "Measurement of a broadband negative index with space-coiling acoustic metamaterials." Physical review letters 110.17 (2013): 175501.

Yang, Z., et al. "Acoustic metamaterial panels for sound attenuation in the 50-1000 Hz regime." Applied Physics Letters 96.4 (2010): 041906.

Yang, Z., et al. "Membrane-type acoustic metamaterial with negative dynamic mass." Physical review letters 101.20 (2008): 204301.

Zhang, Shu, Chunguang Xia, and Nicholas Fang. "Broadband acoustic cloak for ultrasound waves." Physical Review Letters 106.2 (2011): 024301.

Zhang, Shu, Leilei Yin, and Nicholas Fang. "Focusing ultrasound with an acoustic metamaterial network." Physical review letters 102.19 (2009): 194301.

Zhu, Weiren, Changlin Ding, and Xiaopeng Zhao. "A numerical method for designing acoustic cloak with homogeneous metamaterials." Applied physics letters 97.13 (2010): 131902.

Zhu, Xuefeng, et al. "P T-symmetric acoustics." Physical Review X 4.3 (2014): 031042. Zigoneanu, Lucian, Bogdan-Ioan Popa, and Steven A. Cummer. "Three-dimensional broadband omnidirectional acoustic ground cloak." Nat. Mater 13.4 (2014): 352-355.

Vector field microphones have been reported and used. See:

Abhayapala, Thushara D., and Darren B. Ward. "Theory and design of high order sound field microphones using spherical microphone array." Acoustics, Speech, and Signal Processing (ICASSP), 2002 IEEE International Conference on. Vol. 2. IEEE, 2002.

Bertet, Stéphanie, Jérôme Daniel, and Sébastien Moreau. "3D sound field recording with higher order ambisonics-objective measurements and validation of spherical microphone." Audio Engineering Society Convention 120. Audio Engineering Society, 2006.

De Kat, Roeland, Bas W. Van Oudheusden, and Fulvio Scarano. "Instantaneous planar pressure field determination around a square-section cylinder based on time resolved stereo-PIV." Proceedings of the 14th International Symposium on Applications of Laser Techniques to Fluid Mechanics, Lisbon, Posrtugal, 07-10 Jul., 2008, paper No. 1259. Calouste Gulbenkian Foundation, 2008.

De Kat, Roeland, Bas W. Van Oudheusden, and Fulvio Scarano. "Instantaneous planar pressure field determination around a square-section cylinder based on time resolved stereo-PIV." Proceedings of the 14th International Symposium on Applications of Laser Techniques to Fluid Mechanics, Lisbon, Posrtugal, 07-10 Jul., 2008, paper No. 1259. Calouste Gulbenkian Foundation, 2008.

Handzel, Amir A., and P. S. Krishnaprasad. "Biomimetic sound-source localization." IEEE Sensors Journal 2.6 (2002): 607-616.

McCowan, kin A., and Hervé Bourlard. "Microphone array post-filter based on noise field coherence." IEEE Transactions on Speech and Audio Processing 11.6 (2003): 709-716.

Miles, R. N., et al. "A low-noise differential microphone inspired by the ears of the parasitoid fly *Ormia ochracea*." The Journal of the Acoustical Society of America 125.4 (2009): 2013-2026.

Miles, Ronald N. Biomimetic Acoustic Sensors. State Univ of New York At Binghamton Dept Of Mechanical Engineering, 1999.

Miles, Ronald. "Fly-Inspired Microphone for Directional Hearing Aids: Unusual Ears Lead to Smaller Microphone Technology." The ASHA Leader 16.7 (2011): 5-6.

Oh, Geok-Lian, Woon-Chong Siaw, and Cheng-Lock Yap. "Bio-Inspired Robust Direction-Finding With A Miniaturized Microphone Array."

Picard, C., and J. Delville. "Pressure velocity coupling in a subsonic round jet." International Journal of Heat and Fluid Flow 21.3 (2000): 359-364.

Tan, Lin, et al. "Response of a biologically inspired MEMS differential microphone diaphragm." AeroSense 2002. International Society for Optics and Photonics, 2002.

Williams, Earl G., et al. "Volumetric acoustic vector intensity imager." The Journal of the Acoustical Society of America 120.4 (2006): 1887-1897.

Wu, Yue Ivan, Kainam Thomas Wong, and Siu-Kit Lau. "The acoustic vector-sensor's near-field array-manifold." IEEE Transactions on Signal Processing 58.7 (2010): 3946-3951.

US Patent and Pub. App. Nos. U.S. Pat. Nos. 7,146,014; 7,697,700; 7,952,962; 8,026,496; 8,172,036; 8,534,417; 8,579,073; 8,596,410; 8,611,565; 8,616,329; 8,857,564; 9,076,429; 9,199,217; 9,275,622; 9,390,702; 9,417,465; 9,418,646; 9,432,764; 9,437,183; 9,466,283; 20030228025; 20080316863; 20110277201; 20110311078; 20120000726; 20120061176; 20120068383; 20120225411; 20120248460; 20120288627; 20120289869; 20130133979; 20130187169; 20140027201; 20140116802; 20140126322; 20140305049; 20140341419; 20140355381; 20150015930; 20150129351; 20150228269; 20150279345; 20150331102; 20150334487; 20160019879; 20160036133; 20160044417; 20160078857; 20160166852; 20160184790; 20160189702; 20160220850; 20160261938; 20160271870; and 20160271875; each of which is expressly incorporated herein by reference.

Miniaturized flow sensing with high spatial and temporal resolution is crucial for numerous applications, such as high-resolution flow mapping [73], controlled microfluidic systems [74], unmanned micro aerial vehicles [75-77], boundary layer flow measurement [78], low-frequency sound source localization [79], and directional hearing aids [37]. It has important socio-economic impacts involved with defense and civilian tasks, biomedical and healthcare, energy saving and noise reduction of aircraft, natural and man-made hazard monitoring and warning, etc. [73-79, 37, 7]. Traditional flow-sensing approaches such Laser Doppler Velocimetry, Particle Image Velocimetry, and hot-wire anemometry have demonstrated significant success in certain applications. However, their applicability in a small space is often limited by their large size, high power consumption, limited bandwidth, high interaction with medium flow, and/or complex setups. There are many examples of sensory hairs in nature that sense fluctuating flow by deflecting in a direction perpendicular to their long axis due to forces applied by the surrounding medium [80-83, 2, 65]. The simple, efficient and tiny natural hair-based flow sensors provide an inspiration to address these difficulties. Miniature artificial flow sensors based on various transduction approaches have been created that are inspired by natural hairs [52, 7, 84-88]. Unfortunately, their motion relative to that of the surrounding flow is far less than that of natural hairs, significantly limiting their performance [52, 7].

Directional hearing aids have been shown to make it much easier for hearing aid users to understand speech in noise [6]. Existing directional microphone systems in hearing aids rely on two microphones to process the sound field, essentially comprising a first-order directional small-aperture array. Higher-order arrays employing more than two microphones would doubtless produce significant benefits in reducing unwanted sounds when the hearing aid is used in a noisy environment. Unfortunately, problems of microphone self-noise, sensitivity matching, phase matching, and size have made it impractical to employ more than two microphones in each hearing aid.

It is well-known that the frequency response of first order arrays (using a pair of microphones) falls in proportion to frequency as the frequency is reduced below the dominant resonant frequency of the microphones. In a second order array, the response drops with frequency squared, making it difficult to achieve directional response over the required range of frequencies. It has not been possible to overcome this fundamental limitation in sensor technology through the use of signal processing; the inherent noise in the microphones and difficulties with sensor matching comprise insurmountable performance barriers. An entirely new approach to directional sound sensing as proposed here is needed to improve hearing aid performance. It is well-known that the cause of the extreme attenuation of the frequency dependence of the first and second order response is that the response is achieved by estimating either the first of the second spatial derivative of the sound pressure. In a typical sound field, such as a plane wave, these quantities inherently become much smaller as frequency is reduced. The fiber microphone described here will circumvent the adverse frequency dependence of a first order directional array by relying on the detection of acoustic particle velocity rather than pressure. This will enable the creation of first-order directionality with inherently flat frequency response. The use of these devices in an array will enable second order directionality with the frequency dependence of a pressure-based first order array, as is currently used in hearing aids.

Many portable electronic products, such as hearing aids, require miniature directional microphones. An additional difficulty with current miniature microphones is that their reliance on capacitive sensing requires the use of a bias voltage and specialized amplifier to transduce the motion of the pressure-sensing diaphragm into an electronic signal. The present invention has the potential of avoiding all of the above difficulties by providing a directional output that is independent of frequency, without the requirement of sampling the sound at multiple spatial locations, and without the need for external power. This invention has the potential of providing a very low-cost microphone.

Digital signal processing and wireless technology in hearing aids has created a technology revolution that has greatly expanded the performance of hearing aids. While wireless technology can enable the use of microphones that are not closely located [32], improved directional microphone technology can enable substantial performance improvements in any design. Regardless of the signal processing approach used, all existing directional hearing aids rely on the detection of differences in pressure at two spatial locations to obtain a directionally-sensitive signal. Of course, as the frequency is reduced and the wavelength of sound becomes large relative to the spacing between the microphones, the difference in the detected pressures becomes small and the performance of the system suffers due to microphone noise and sensitivity and/or phase mismatch. Microphone performance limitations have placed a technology barrier on the use of directional hearing aids having better than first-order directivity.

While the difficulties of implementing higher-order pressure microphone arrays have been somewhat manageable with first-order arrays using only two microphones, the resulting directionality is quite modest and has produced much less real-world benefit to hearing aid users than hoped [60]. A number of studies have explored the reasons for this including the effects of visual cues, listener's age [57, 58, 59] and the fact that typical hearing aids are not directional enough for users to notice a benefit [31]. Studies of the effects of open fittings where the ear canal is not occluded have shown that the perception of directional benefit is strongly influenced by directionality at low frequencies [30].

The ultimate aim of flow sensing is to represent the perturbations of the medium perfectly. Hundreds of millions of years of evolution resulted in hair-based flow sensors in terrestrial arthropods that stand out among the most sensitive biological sensors known, even better than photoreceptors which can detect a single photon ($10^{-18}$-$10^{-19}$J) of visible light. These tiny sensory hairs can move with a velocity close to that of the surrounding air at frequencies near their mechanical resonance, in spite of the low viscosity and low density of air. No man-made technology to date demonstrates comparable efficiency.

Predicted and measured results indicate that when fibers or hairs having a diameter measurably less than one micron are subjected to acoustic excitation, their motion can be a very reasonable approximation to that of the acoustic particle motion at frequencies spanning the audible range. For much of the audible range of frequencies resonant behavior due to reflections from the supports tends to be heavily damped so that the details of the boundary conditions do not play a significant role in determining the overall system response. Thin fibers are thus constrained to simply move with the surrounding medium. These results suggest that if the diameter or radius is chosen to be sufficiently small, incorporating a suitable transduction scheme to convert its mechanical motion into an electronic signal could lead to a sound sensor that very closely depicts the acoustic particle motion over a wide range of frequencies.

It is very common to observe fine dust particles or thin fibers such as spider silk that move about due to very subtle air currents. It is well known that at small scales, viscous forces in a fluid provide a dominant excitation force. The fluid mechanics of the interaction of thin fibers with viscous fluids can present a very challenging problem in fluid-structure interaction. This is because the presence of a thin fiber will have a pronounced effect on the flow in its immediate vicinity. While even the thinnest fibers can have a dramatic influence on the motion of a viscous fluid near the fiber, in many situations, it is reasonable to expect their motion to closely resemble that of the mean flow.

The motion of a thin fiber that is held on its two ends and subjected to oscillating flow in the direction normal to its long axis is considered. The flow is assumed to be associated with a plane traveling sound wave. The main task here is to determine if there is a set of properties (such as radius, length, material properties) that will enable the fiber's motion to constitute a reasonable approximation to the acoustic particle motion. For sound in air, fibers having a diameter that is at the sub-micron scale, exhibit motion that corresponds to that of the surrounding air over the entire audible range of frequencies.

For objects that are sufficiently small, some insight into the forces and subsequent motion can be acquired by considering the air to behave as a viscous fluid. The viscous forces in a fluid applied to a thin cylinder were perhaps first analyzed by Stokes [50]. This problem is one of the few in fluid mechanics that submits to treatment by mathematical analysis. Slender body theory for the determination of fluid forces on small solid objects has been examined at length since Stokes' time [49]. Stokes obtained series solutions for the forces and fluid motion due to a cylinder oscillating in a viscous fluid. His effort predated the existence of Bessel functions which enable the solution to be expressed in a convenient and compact form that can now be easily evaluated for a wide range of physical parameters [64].

More recent interest in nanoscale systems (either man-made or natural) has spawned renewed enthusiasm for this topic. The flow-induced motion of one or a pair of adjacent fibers held at one end has been examined by Huang et al. [26]. Numerical solutions for the motion of a collection of finite, rigid, thin fibers in a fluid due to gravity have been presented by Tornberg and Gustaysson [53]. Tornberg and Shelly examined the motion of thin fibers in a fluid that were free at each end [54]. Gotz [11] presents a detailed study of the fluid forces on a thin fiber of arbitrary shape. Shelly and Ueda [48] studied the effects of changes in the fiber shape (perhaps as it grows or stretches) on the fluid forces and the resulting motion. Bringley [4] has proposed an extension of the immersed boundary method in which the solid body is represented by a finite array of points.

The use of fibers to sense sound has proven to be a highly effective approach, having been used in nature for millions of years. There have been a number of studies of the use of thin fibers or hairs by animals to detect acoustic signals. Humphrey et al. [27] provide a model for the motion of arthropod filiform hairs extending from a substrate that follows the results provided by Stokes [50]. Bathellier et al. [2] have examined a model for the motion of a filiform hair in which it is represented by a thin rigid rod that pivots about its base. The base support is represented by a torsional dashpot and a torsional spring. The torsional dashpot at the base accounts for the absorption of energy by the sensory system.

For sufficiently long, thin hairs, there will also be substantial damping due to viscous forces in the fluid, which also provide the primary excitation force. It is well known that the maximum energy transfer (or harvesting) occurs when the impedance of the sensor matches that of the detection circuitry so one would expect optimal energy transfer at resonance and where the damping in the fluid matches that of the substrate support. Depending on the method used to achieve transduction from mechanical to electrical domains, it may be more beneficial to simply design for maximum displacement (or velocity) rather than maximum energy transfer, which can occur only at resonance when the contributions due to stiffness and inertia in the impedance cancel. Bathellier et al. [2] also make the very important observation that if one wishes to sense signals at frequencies above the resonant frequency of the hair, it is desirable that the hair be very thin and lightweight so that damping forces due to air viscosity dominate over those associated with inertia.

Mosquitoes detect nano-meter scale deflections of the sound-induced air motion using their antennae [9]. Male mosquitoes often have antennae with a large number of very fine hairs that provide significant surface area and subsequent drag force from the surrounding air. Rotations at the base of the antennae are detected by thousands of sensory cells in the Johnston's organ [28]. The transduction process used in some insects has been demonstrated to employ active amplification which was previously believed to occur only in vertebrates having tympanal ears [10,43]. Spiders also employ remarkable sensor designs to transduce the extremely minute rotation or strain at the base of a hair into a neural signal [1].

Hairs have also been shown to enable jumping spiders to hear sound at significant distances from the source. [65].

Sound sensors composed of thin, lightweight structures have been in use since the earliest days of audio engineering. The vast majority of microphones are designed to detect pressure by sensing the deflection of a thin membrane on which the sound pressure acts. The ribbon microphone consists of a thin, narrow conducting ribbon that is designed to respond to the spatial gradient of the sound pressure due to the pressure difference across its two opposing faces [29, 44, 45]. The ribbon is placed in a magnetic field and the open circuit voltage across the ribbon is proportional to the ribbon's velocity [45]. The electrical output is roughly proportional to the acoustic velocity which, in a plane sound wave, is also proportional to the sound pressure.

The present approach could be viewed as an extension of the ribbon microphone design where the ribbon is replaced by a fiber. The ribbon microphone normally uses electrodynamic transduction. It should be noted that unlike the fiber microphone described here, the essential operating principle of a ribbon microphone is not dependent on fluid viscosity; the ribbon is considered to be driven by pressure gradients, even in an inviscid fluid medium.

A number of engineered devices have been fabricated over the past decade in an attempt to approach the flow sensing capabilities of insect hairs. A comprehensive review of engineered flow sensors based on hairs is provided in [52]. The overall approach in these designs is to create a light-weight, rigid rod with sensing incorporated at the rotational support at the base. The flow-induced motion of MEMS flow sensors has been found to be more than two orders of magnitude less than that of cricket cercal hairs [7].

Because the present technology can measure motion of thin structures that are driven by viscosity, it is also possible to measure the acoustic particle velocity by detecting the heat flow around a fine wire that is heated by an electric current. This principle has been employed in a successful commercial sound sensor, the Microflown [66].

Sound velocity vector sensors have also been employed in liquids to detect the direction of propagation of underwater sound [67]. As with the ribbon microphone, these devices generally are intended to respond to pressure gradients or differences across their exterior rather than on viscous forces; analysis of their motion does not depend on the fluid viscosity.

SUMMARY OF THE INVENTION

According to the present technology, a fiber or ribbon provided as a vibration-sensing conductive element in a fluid medium, employing a magnetic field to induce a voltage across the conductive element as a result of oscillations within the magnetic field.

The thin fiber is held on its two ends and subjected to oscillating flow in the direction normal to its long axis as a result of viscous drag of a fluid medium that itself responds to vibrations. The flow is, for example, associated with a plane traveling sound wave.

An ideal sensor should represent the measured quantity with full fidelity. All dynamic mechanical sensors have resonances, a fact which is exploited in some sensor designs to achieve sufficient sensitivity. This comes with the cost of limiting their bandwidth. Other designs seek to avoid resonances to maximize their bandwidth at the expense of sensitivity.

Nanodimensional spider silk captures fluctuating airflow with maximum physical efficiency ($V_{silk}/V_{air} \approx 1$) from 1 Hz to 50 kHz, providing an unparalleled means for miniaturized flow sensing [108]. A mathematical model shows excellent agreement with experimental results for silk with various diameters: 500 nm, 1.6 μm, 3 μm [108]. When a fiber is sufficiently thin, it can move with the medium flow perfectly due to the domination of forces applied to it by the medium over those associated with its mechanical properties. These results suggest that the aerodynamic property of silk can provide an airborne acoustic signal to a spider directly, in addition to the well-known substrate-borne information. By modifying a spider silk to be conductive and transducing its motion using electromagnetic induction, a miniature, directional, broadband, passive, low cost approach to detect airflow with full fidelity over a frequency bandwidth is provided that easily spans the full range of human hearing, as well as that of many other mammals. The performance closely resembles that of an ideal resonant sensor but without the usual bandwidth limitation.

For sound waves propagating in air, fibers having a diameter that is at the submicron scale, exhibit motion that corresponds to that of the surrounding air over the entire audible range of frequencies. If the diameter of a fiber is sufficiently small, its motion will be a suitable approximation to that of the air, to provide a reliable means of sensing the sound field. Allowing the "hair" fiber to be extremely thin also means that its flexibility due to bending loads should be accounted for, which is not normally considered in previous models of hair-like sensors in animals. In modeling animal sensory hairs, it is assumed that the motion can be represented by that of a thin rigid rod that pivots at the base rather than as a beam that is flexible in bending [27]. The model presented below considers the fiber to be a straight beam that is held on its two ends. The governing partial differential equation of motion of this system is examined, accounting for the effects on axial tension due to an axial static displacement of one end, nonlinear axial tension due to large deflections, and fluid loading due to a fluctuating fluid medium.

A small set of the design parameters that may be considered to construct a fiber or hair-based sound sensor are more fully explored. The first parameter to be sorted out is the hair radius. A qualitative and quantitative examination of the governing equations for this system indicates that for sufficiently small values of the fiber's radius, the motion is entirely dominated by fluid forces, causing the fiber to move with nearly the same displacement as the fluid over a wide range of frequencies.

The driving force on the ribbon or fiber is the due to the difference in pressure on its two sides. Since the two sides are close to each other, that difference in pressure is nearly proportional to the pressure gradient (spatial derivative). That is why they are also called pressure gradient microphones. In a plane wave sound field, the pressure gradient turns out to also be proportional to the time derivative of the pressure.

So, the effective force on the ribbon or fiber is essentially proportional to the time derivative of the pressure. Newton says that the force is equal to the mass multiplied by the acceleration, or time derivative of the velocity of the ribbon. Both sides of F=ma are integrated over time, you get a ribbon or fiber velocity that is proportional to the sound pressure. All of this is because it is driven by pressure gradient. The transduction into an electronic signal gives an output voltage that is proportional to the ribbon velocity, and hence, also proportional to the pressure. Note that the ribbon velocity is only proportional to the air velocity, not equal to it. The velocity of the ribbon will be inversely proportional to its mass, so it is preferable to make the ribbon or fiber out of a lightweight material, e.g., aluminum.

A thin fiber, supported on each end, moves in response to a flow of a viscous fluid surrounding it. For a sufficiently thin fiber, the motion is dominated by viscous fluid forces. The mechanical forces associated with the fiber's elasticity and mass become negligible. This simple result is entirely in line with any observations of thin fibers in air; the thinner they are, the more easily they move with subtle air currents. The dominance of viscous forces on thin fibers makes them ideal for sensing sound.

It should be pointed out that the motion of the fiber and of the surrounding fluid are assumed to be adequately represented by considering both to be a continuum. A primary interest is in detecting air-borne sound so the fluid is taken to be a rarefied gas. A continuum model is considered to be valid when the Knudsen number $K_n$, given by ratio of the mean free path λ, of the molecules relative to some characteristic dimension of the system is less than about $K_n \approx 10^2$ [68]. The mean free path for air is approximately $\lambda \approx 65 \times 10^{-9}$ meters [68]. The characteristic dimension is taken to be the fiber diameter, the continuum model is then considered reliable for diameters greater than about 6.5 microns, greater than those of interest here.

In spite of the limitations of the simplified continuum model presented here, our experimental results indicate that the flow-induced motion of sub-micron diameter fibers closely resembles that of the spatial average of the velocity of the molecules comprising the fluid that are in close proximity to the fiber. The fiber appears to move in response to the large number of molecular interactions with the gas according to the average force along its length. Even at the molecular scale, the fiber motion can represent the sound-induced flow, which is the sound-induced fluctuating average of the random thermal motion of a large number of gas molecules.

Predicted and measured results indicate that when fibers or hairs having a diameter measurably less than one micron are subjected to acoustic excitation, their motion can be a very reasonable approximation to that of the acoustic particle motion at frequencies spanning the audible range. When their diameter is reduced to the sub-micron range, the results presented here suggest that forces associated with mechanical behavior, such as bending stiffness, material density, and axial loads, can be dominated by fluid forces associated with fluid viscosity. Resonant behavior due to reflections from the supports tends to be heavily damped so that the details of the boundary conditions do not play a significant role in determining the overall system response; thin fibers are constrained to simply move with the surrounding viscous fluid.

It is important to note that the analytical calculation of the viscous fluid force assumes that the fluid can be represented as a continuum, which is clearly not valid as the fiber diameter is reduced indefinitely.

The present oversimplified model can provide insight into the dominant design parameters one should consider in a quest for a fiber-based sound sensor. The model suggests that once the fiber diameter is reduced to fractions of a micron, the fiber motion becomes remarkably similar to that of the flow. The mathematical model is verified by experimental results.

The results presented here indicate that if the diameter or radius is chosen to be sufficiently small, incorporating a suitable transduction scheme to convert its mechanical motion into an electronic signal could lead to a sound sensor that very closely depicts the acoustic particle motion.

According to this technology, the driving force for movement is due to the viscosity of air, giving a force that is directly proportional to air velocity. It isn't designed to capture a pressure gradient per se. If the ribbon (actually, a fiber) is thin enough, viscous forces cause its velocity to equal that of the air. Once it is thin enough, its mass or stiffness no longer affect how much it moves. It has no choice but to move with the air.

The ideal microphone diaphragm (or sensing element) should have no mass and no stiffness. This type of sensing element will provide an estimate of the motion of a suitably large population of air molecules in the sound field. The element (i.e. diaphragm or ribbon) will simply move with the air. This will happen with an omnidirectional microphone diaphragm too. It will experience the same forces as the air molecules so its motion will be an ideal representation of the sound field since it moves just like the air. However, an efficient transducer design is not readily apparent from known designs of fiber transducers.

The present technology provides a directional microphone that responds to minute fluctuations in the movement of air when exposed to a sound field. The ability to respond to fluctuating air velocity rather than pressure, as in essentially all existing microphones, provides an output that depends on the direction of the traveling sound wave. The transduction method employed here provides an electronic output without the need of a bias voltage, as in capacitive microphones. Because the microphone responds directly to the acoustic particle velocity, it can provide a directionally-dependent output without needing to sample the sound field at two separate spatial locations, as is done in all current directional microphones. This provides the possibility of making a directional acoustic sensor that is considerably smaller than existing miniature directional microphone arrays.

The technology combines two ideas. The first is that extremely fine fibers will move with extremely subtle air currents. Sound waves create minute fluctuations in the position of the molecules in the medium (air in this case). An analytical model predicts that for fibers that are less than approximately on micron in diameter, viscous forces in the air will cause the fiber to move with the air for frequencies that cover the audible range. The velocity of the fiber becomes equal to that of the air as the fiber diameter is diminished. In a plane sound wave, the acoustic velocity is proportional to the sound pressure. The wire velocity will then be proportional to the sound pressure. The analytical model for the response of a thin fiber due to sound has been verified using a fiber. Comparisons of predictions and measured results show that the model captures the essential features of the response.

The second essential idea of this invention pertains to the transduction of the fiber motion into an electronic signal. Because the fiber velocity will be proportional to sound pressure as mentioned above, an electronic transduction that converts the fiber velocity to a voltage is appropriate. Fortunately, Faraday's law tells us that if a conductor is placed in a magnetic field, the voltage across the ends of the conductor will be proportional to the conductor's velocity. This principle is commonly used in electrodynamic microphones to obtain an output signal that is proportional to the velocity of a coil of wire attached to a microphone diaphragm. To utilize Faraday's law with a fiber or ribbon, one merely needs to incorporate a magnet near a thin conducting fiber with sufficient magnetic flux intensity to achieve the desired electronic output. This concept has been demonstrated using a 6 micron diameter stainless steel fiber, approximately 3 cm long in the vicinity of a permanent magnet as well as with fibers having diameter at the nanoscale [42,108].

This technology has the potential of providing a number of important advantages over existing technology. The microphone could be made without any active electronic components, saving cost and power. A directional output can be obtained that is nearly independent of the frequency of the sound. A directional output can be obtained that does not require a significant port spacing (approximately 1 cm on current hearing aids). This could greatly simplify hearing aid design and reduce cost.

It is therefore an object to provide a method of sensing sound that enables hearing aid designers with the ability to create high-order directional acoustic sensing. This will enable hearing aid designs that greatly improve speech intelligibility in noisy environments. The preferred design is a miniature sensor that has inherent, first order directivity and flat frequency response over the audible range. The use of this device in an array will remove previously insurmountable barriers to higher order acoustic directionality in small packages.

A one dimensional, nano-scale fiber responds to airborne sound with motion that is nearly identical to that of the air. This occurs because for sufficiently thin fibers, viscous forces in the fluid can dominate over all other forces within the sensor structure. The sensor preferably provides viscosity-based sensing of sound within a packaged assembly. Sufficiently thin and lightweight materials can be designed, fabricated and packaged in an assembly such that, when driven by a sound field, will respond with a velocity closely resembling that of the acoustic particle velocity over the range of frequencies of interest in hearing aid design.

For sufficiently small diameter fibers, the motion is entirely dominated by forces applied by the viscous fluid (i.e. air); the mechanical forces associated with the fiber's elasticity and mass become negligible. This simple result is entirely consistent with any observations of thin fibers in air; the thinner they are, the more easily they move with subtle air currents. The dominance of viscous forces on thin fibers makes them ideal for sensing sound.

A preferred design according to the present technology has a noise floor of 30 dBA, flat frequency response ±3 dB, and a directivity index of 4.8 dB (similar to an acoustic dipole) over the audible range.

Pressure is detected in nearly all acoustic sensing applications. A sound sensor is desired that is inherently directional, and responds to a vector quantity (or at least a component of it in one direction) rather than the scalar pressure applied to a microphone diaphragm.

It is well known that the fluid velocity $\vec{U}$, or acceleration $\dot{\vec{U}}$, is directly related to the vector pressure gradient $\nabla\vec{P}$ through $$\nabla\vec{P}=\rho_0\dot{\vec{U}} \tag{1}$$

where $\rho_0$ is the nominal density of the acoustic medium. One can view a first order small aperture array (having size less than the sound wavelength) to be a means of obtaining an estimate of the component of the pressure gradient in the direction parallel to the line connecting the two microphones. Equation (1) shows that the direct detection of the fluid velocity or acceleration is fundamentally equivalent to detecting the vector pressure gradient. As mentioned above, the use of two closely spaced microphones to estimate the pressure gradient can lead to substantial difficulties as one attempts to detect small differences in signals that are dominated by the common, or average, signal. The detection of velocity is based on altogether different principles than pressure sensing and hence, does not suffer from the same technical barriers.

A particular central innovation uses nanoscale fibers for the purpose of detecting the directional acoustic fluid velocity $\dot{\vec{U}}$ in equation (1) [42]. If the diameter of a fiber is sufficiently small, its motion will be a suitable approximation to that of the air to provide a reliable means of sensing the sound field. Allowing the fiber or ribbon to be extremely thin requires accounting for its flexibility due to bending loads, which is not normally considered in previous models of hair-like sensors in animals.

In modeling animal sensory hairs, it is assumed that the motion can be represented by that of a thin rigid rod that pivots at the base rather than as a beam that is flexible in bending [27]. A model provided by the present technology considers the fiber to be a straight, flexible beam that is held on its two ends. The governing partial differential equation of motion of this system accounts for the effects on axial tension due to an axial static displacement of one end, nonlinear axial tension due to large deflections, and fluid loading due to a fluctuating fluid medium.

An approximate analytical model is presented below to examine the dominant forces and response of a nanofiber in a sound field. The fiber is modeled as a beam including simple Euler-Bernoulli bending and axial tension and is subjected to fluid forces by the surrounding air. This analysis shows that for sufficiently small diameter fibers, the motion is entirely dominated by forces applied by the viscous fluid (i.e. air); the mechanical forces associated with the fiber's elasticity and mass become negligible. This simple result is entirely in line with any observations of thin fibers in air; the thinner they are, the more easily they move with subtle air currents. The dominance of viscous forces on thin fibers makes them ideal for sensing sound.

Assume the long axis of the nanofiber is orthogonal to the direction of propagation of a harmonic plane wave. Let the x direction be parallel to the nanofiber axis and the y direction be the direction of sound propagation. The harmonic plane sound wave at the frequency $\omega$ (radians/second) creates a pressure field $p(y,t)=Pe^{i(\omega t-ky)}$, where $k=\omega/c$ is the wave number, P is the complex wave amplitude, and c is the speed of wave propagation. The plane sound wave also creates a fluctuating acoustic particle velocity field in the y direction, $$u(y,t) = p(y,t) = Pe^{i(\omega t-ky)} = \frac{p(y,t)}{\rho_0 c} = \frac{Pe^{i(\omega t-ky)}}{\rho_0 c} \tag{2}$$

where $\rho_0$ is the nominal air density and $U=P/(\rho_0 c)$ is the complex amplitude of the acoustic particle velocity.

Let the transverse deflection in the y direction (orthogonal to the long axis) of the nanofiber be $w(t)=We^{i\omega t}$. The fluid motion in the immediate vicinity of the fiber will be strongly influenced by the presence of the fiber. An analytical model is sought for the fiber motion relative to the fluid motion that would occur if the fiber were not present (i.e. that given by equation (2).

The fluid forces on the fiber may be determined by considering the problem of a straight cylinder that is moving with some velocity $v(t)=Ve^{i\omega t}$ within a viscous fluid that is at rest at locations far from the fiber. The forces on this moving cylinder along with the flow field near the cylinder were worked out by Stokes [50]. Stokes' series solution to the governing differential equations may be written in terms of Bessel functions [64]:

$$f_v(t) = F_v e^{i\omega t} = \frac{\rho_0 ckr\pi i}{m}\left(4\frac{K_{1(mr)}}{K_0(mr)} + mr\right)Ve^{i\omega t} = Z(\omega)e^{i\omega t} \tag{3}$$

where $K_0(mr)$ and $K_1(mr)$ are the modified Bessel functions of the second kind, of order 0 and 1, respectively, $m=\sqrt{(i\omega\rho_0/\mu)}$, and $\mu$ is the dynamic viscosity. $Z(\omega)$ is defined to be the impedance of the fiber, $$Z(\omega) = \frac{F_v}{V} = \frac{\rho_0 ckr\pi i}{m}\left(4\frac{K_{1(mr)}}{K_0(mr)} + mr\right) \tag{4}$$

The real and imaginary parts of the impedance may be interpreted as an equivalent frequency-dependent dashpot $C(\omega)$ and co-vibrating mass (i.e. the equivalent mass of fluid that moves with the fiber), $M(\omega)$, $Z(\omega)=C(\omega)+i\omega M(\omega)$, where $C(\omega)$ is the real part of $Z(\omega)$, and $\omega M(\omega)$ is the imaginary part.

The fluid force and subsequent fiber motion are of interest due to a sound-induced fluid velocity, $u(0,t)$, $v(t)=Ve^{i\omega t}=u(0,t)-\dot{w}(x,t)=(U-i\omega W(x))e^{i\omega t}$ is taken to be the relative velocity between the fiber and the fluid.

Viscous forces due to the relative motion between the fiber and the fluid may be decomposed into a drag force per unit length which is proportional to the relative velocity between the fluid and the fiber, $F_d=C(u-\dot{w})$ and a force per unit length due to the inertia of the air that vibrates with the fiber. This force will be proportional to the relative acceleration of the fiber and the surrounding fluid, $F_m=M(\dot{u}-\ddot{w})$.

The interest here is with fibers that are in some manner connected at each of the two ends to a rigid substrate. Transverse deflections of the fiber may be estimated by representing the fiber as a thin beam or a string. Elastic restoring forces due to the bending (or curvature) of the fiber along with restoring forces due to any axial tension as in strings is accounted for. Assume that the fiber has a circular cross section of radius r and moves as a Euler-Bernoulli beam of length 1, which leads to the following governing differential equation of motion [71], $$EIw_{xxxx} - EAw_{xx}\left(\frac{Q(l)}{l} + \frac{1}{2l}\int_0^l w_x^2 dx\right) + \rho_m A\ddot{w} = f_v(t) \tag{5}$$

where E is Young's modulus of elasticity, $I=\pi r^4/4$ is the area moment of inertia, $A=\pi r^2$ is the cross sectional area, $\rho_m$ is the volume density of the material and again, r is the radius. Subscripts denote partial differentiation with respect to the spatial variable x. The axial displacement of the fiber is taken to be zero at x=0, and Q(L) is the axial displacement of the end at x=L. The integral in Equation (5) accounts for stretching of the fiber as it undergoes displacements that are on the order of its diameter [71]. This term may normally be neglected for displacements likely to be encountered in a sound field.

It is helpful to first consider the terms on the left side of Equation (5), which account for the elastic stiffness and mass of the fiber. All of these terms depend strongly on the radius of the fiber. It is helpful to express each term in terms of the radius:

$$E\frac{\pi r^4}{4}w_{xxxx} - E\pi^2 w_{xx}\left(\frac{Q(L)}{L} + \frac{1}{2L}\int_o^L w_x^2 dx\right) + \rho_m \pi r^2 \ddot{w} = C(u - \dot{w}) + M(\dot{u} - \ddot{w}) = f_v(t) \tag{6}$$

Before examining the terms in equations (5) or (6) that are due to viscous fluid forces, consider the terms on the left side of this equation, which account for the elastic stiffness and mass of the fiber. All of these terms depend strongly on the radius of the fiber. It is evident that all terms that are proportional to the material properties of the fiber (i.e., the Young's modulus, E, or the density, $\rho_m$) are proportional to either $r^4$ or $r^2$. The dependence on the radius r on the right side of Equation (5) is, unfortunately, more difficult to calculate owing to the complex mechanics of fluid forces. It can be shown, however, that these fluid forces tend to depend on the surface area of the fiber rather than the cross sectional area as are the dominant terms on the left side of equation (5). The surface area is proportional to its circumference ($2\pi r$), and hence is proportional to r rather than $r^2$ as is the cross sectional area $\pi r^2$, or area moment of inertia $\pi r^4/4$. As r becomes sufficiently small, the terms proportional to C and M will clearly dominate over mechanical forces. For thin fibers the viscous terms that are proportional to C and M will dominate even over the nonlinear stretching term (given by the integral) in equation (5). This enables design of acoustic sensors having dynamic range that is not limited by structural nonlinearities. This observation on its own suggests the technology will revolutionize acoustic sensing. This very simple observation is important and enables thin fibers to behave as ideal sensors of sound.

To illustrate the sensitivity of the viscous force to the radius, r, FIG. 12 shows the result of evaluating the above equation at a frequency of $\omega=2\pi\times1000$ for a range of values of radius from 50 nanometers to 10 microns. FIG. 12 shows that the viscous force is a very weak function of the radius for values of r of interest here. While, again, this result is based on a continuum model for the fluid and of the fibers, which becomes inappropriate for some extremely small radius value, interaction forces with the fluid will typically dominate over those within the fiber, even accounting for molecular forces within the rarefied gas, as demonstrated from experimental results.

The viscous force is not a strong function of the fiber radius r. The result of evaluating the viscous force equation is shown for a wide range of values of the radius r, assuming the frequency is 1 kHz. The fiber is assumed to undergo a velocity of 1 m/s at each frequency. The fluid is assumed to be stationary at large distances from the fiber. The force varies by roughly a factor of 10 as the radius varies by a factor of 100 from 0.1 μm to 10 μm. As a result, as the fiber radius becomes small, fluid forces dominate over the forces on the left side of equation (5).

It should be noted that for thin fibers the viscous force will dominate even over the nonlinear stretching term (given by the integral) in equation (5). This fact could enable the design of acoustic sensors having dynamic range that is not limited by structural nonlinearities.

For sufficiently small values of the radius, r, the governing equation of motion of the fiber, equation (3) becomes simply $$0 \approx f_v(t) = \frac{\rho_0 ckr\pi i}{m}\left(4\frac{K_{1(mr)}}{K_0(mr)} + mr\right)(u(0, t) - \dot{w}(x, t)) \tag{7}$$

which has the solution $\dot{w}(x,t)=u(0,t)$, where, again, $u(0,t)=u(y,t)_{y=0}$, regardless of the other parameters in this equation as long as the left side of equation may be neglected. Of course, this shows that the fiber moves with the fluid when the fiber is sufficiently thin. While r dependence of the above equations indicates the mechanical forces may be neglected for small r, solutions must be examined to identify the range of values of r that enable the fiber motion to adequately represent that of the fluid.

While a quantitative estimate of the fluid force may not be accurate, the conclusion is still supported by the measured data: the fluid forces dominate over the forces within the solid fiber for sufficiently thin fibers. Since the fluid forces are proportional to the relative motion between the fiber and the fluid, the fiber and fluid thus move together. This coupled motion will occur regardless of the value of the viscous force as long as it dominates over the forces in the solid.

For sufficiently small values of the radius, r, the governing equation of motion of the fiber (equations (3)) becomes simply $$0=C(u-\dot{w})+M(\dot{u}-\ddot{w}) \tag{8}$$

which has the solution $\dot{w}=u$. Of course, this shows that the fiber moves with the fluid when the fiber is sufficiently thin.

In the following, a solution is provided to equation (5) to obtain a model for the motion of a thin fiber of length L that is driven by sound. To construct a reasonably simple model, the sound-induced deflection is assumed to be sufficiently small that the nonlinear response due to the integral in equation (5) may be neglected.

Solutions of equation (5) are examined in order to examine the range of values of the radius r in which viscous forces dominate the response of the fiber in a harmonic plane-wave sound field. In the simplest case, consider the response of a fiber that is infinitely long so that no waves are reflected by its boundaries. In the absence of boundaries, the displacement of the fiber w(x,t), will be a constant in x The response of this infinitely long fiber is denoted by wr(t), the governing equation becomes:

$$\rho_m \pi r^2 w_f = f_v(t) \tag{9}$$

For a harmonic sound field having frequency x, let $w_f(t)=W_f e^{i\omega t}$. The sound-induced velocity of the fiber (rather than the displacement) relative to the acoustic particle velocity is simply $$v_f(t)=V_f e^{i\omega t}=\dot{w}_f(t)=i\omega w_f(t)=i\omega W_f e^{i\omega t} \tag{10}$$

which gives $$i\omega\rho_m\pi r2V_I = Z(\omega)(U - V_I) \quad (11)$$

$$\frac{V_I}{U} = \frac{Z(\omega)}{Z(\omega) + i\omega\rho_m\pi r^2} = \frac{C(\omega) + i\omega M(\omega)}{C(\omega) + i\omega\left(M(\omega) + \rho_m\pi r^2\right)} \quad (12)$$

These equations provide essential insight into the dominant parameters in the system, it does not account for the fact that any real fiber must be supported on boundaries that are separated by a finite distance, L. This simple result allows estimation of how small r needs to be so that the fiber velocity is a sufficient approximation to the air velocity, in which case $V_I/U \approx 1$, which will occur when the co-vibrating mass per unit length of the air is sufficiently greater than the mass per unit length of the fiber, $M >> \rho\pi r^2$. This does not account for the fact that any real fiber must be supported on boundaries that are separated by a finite distance, L. In this case, the motion of the fiber will vary with the spatial coordinate, x, so that the terms involving spatial derivatives in equation (3) may no longer be neglected. Solutions of this partial differential equation will, of course, depend on the details of the boundary conditions at x=0 and x=L. Solutions for a variety of possible boundary conditions may be obtained by well-known methods.

To construct a reasonably simple model that captures important effects that are neglected in equation (12), assume that the sound-induced deflection is sufficiently small that the nonlinear response due to integral in equation (5) may be neglected.

To obtain the simplest possible model that accounts for finite boundaries, assume that the fiber is simply-supported on its ends so that w(0,t)=w(L,t)=0 and w(0,t)=w(L,t)=0. The solution to equation (3) may then be expressed as an expansion in the eigenfunctions of a simply-supported beam, $$w(x, t) = \sum_{j=1}^{\infty} n_j(t)\phi_j(x),$$

where $\eta_i(t)$ for j=1, . . . , ∞ are the unknown modal coordinates and $\phi_i(x)=\sin(p_j x)=\sin(j\pi x/L)$ are the eigenfunctions with $p_j=j\pi/L$.

The displacement at the location x for this finite beam can also be expressed as $w_F(x,t)=W_F(x)e^{\hat{i}\omega t}$, where the subscript F denotes that this is a solution for a finite length fiber. The sound-induced velocity of the fiber at this location is $$v_F(x,t)=V_F(x)e^{\hat{i}\omega t}=\hat{i}\omega W_F(x)e^{\hat{i}\omega t} \quad (13)$$

The ratio of the fiber velocity at the location x to the acoustic particle velocity due to a plane harmonic wave with frequency co may then be shown to be $$\frac{V_p(x)}{U} = i\omega\sum_{j=1}^{\infty}\frac{Z(\omega)\phi_j(x)\frac{2}{L}\int_0^L \phi_j(z)dz}{\left(Elp_j^4 + EAp_j^2 Q(L)/L + i\omega\left(Z(\omega) + i\omega\rho_m\pi r^2\right)\right)} \quad (14)$$

Results obtained verify the theoretical model presented above. Sufficiently thin fibers are found to move with same velocity as the air in a sound field. Two types of fibers were measured: natural spider silk and electrospun polymethyl methacrylate (PMMA). The results are compared to predictions in the following. The fibers were placed in an anechoic chamber and subjected to broadband sound covering the audible range of frequencies. A 6 μm diameter stainless steel fiber is suspended, and its position measured with a laser vibrometer. This thickness fiber is too large to obtain ideal frequency response and is shown for illustration purposes. The fiber is approximately 3.8 cm long. The measured and predicted results show excellent qualitative agreement for this non-optimal fiber [42]. The anechoic chamber has been verified to create a reflection-free sound field at all frequencies above 80 Hz. The sound pressure was measured in the vicinity of the wire using a B&K 4138⅛th inch reference microphone. The sound source was 3 meters from the wire. Knowing the sound pressure in pascals, one can easily estimate the fluctuating acoustic particle velocity through equation (13). The measured and predicted results show excellent qualitative agreement for this non-optimal fiber [42].

FIG. 2 shows that the predicted and measured results for the spider silk and the PMMA fiber are nearly identical to each other and are essentially the same as the motion of the air at all frequencies of interest. Also shown are data-based predictions for cricket cercal hairs and for the best existing man-made MEMS acoustic flow sensor [7]. The response of the cricket cercal hair and the MEMS sensor are clearly inferior to the fibers tested here. The spider silk and fiber diameter is approximately 0.6 μm and the length is approximately 3 mm. The fibers were driven by a plane sound wave in the Binghamton University anechoic chamber. The velocity of the middle point of the wire was measured using a laser vibrometer. The wire was soldered to two larger diameter wires which supported it at its ends. The predicted amplitude of the complex transfer function of the wire velocity relative to the acoustic particle velocity is shown in FIG. 7. The predicted results were obtained using equation (13). The velocity was measured using a Polytec OFV 534 laser vibrometer sensor with an OFV-5000 controller. Measurements were performed in the anechoic chamber at Binghamton University. The sound field was measured using a B&K 4138⅛ inch reference microphone. The acoustic particle velocity was estimated from the measured pressure using equation (2).

The results show that both the spider silk and the PMMA fiber exhibit response that is nearly identical to that of the air over the frequency range from 100 Hz to over 10 kHz as predicted by the analytical model of equation (13).

The transducer may be modeled as a simple, one dimensional structure such as a fine fiber or filament with an incident sound wave traveling in the direction orthogonal to the fiber's axis. The fiber's motion may then be detected by measuring its displacement, velocity or acceleration, for example. An electrodynamic sensor modelled as a conductive wire in a magnetic field acts as a velocity sensor. When certain presumptions are met, the fiber behaves as an ideal sensor when placed in an open fixture in the presence of a plane sound wave. Further, meeting these presumptions is feasible in configurations where the fiber is packaged in an assembly that is appropriate for a portable device such as a hearing aid. It is also feasible for a practical implementation of this viscosity-based sensor to include a more general assembly consisting of multiple fibers or similar structures that are joined in a two or three dimensional topology, and thus have a complex spatially dependent response to the sound wave. The interaction between an array of fibers and the surrounding air may differ from that due to an individual fiber, and in particular, the spacing of the fibers, their orientation and length, can all influence to response of the array of fibers to acoustic waves.

An idealized, schematic representation of a potential fiber-microphone package is shown in FIG. 3.

Placing the sensing fiber within a package where the sound field is sampled at two spatial locations as shown, is similar to what is done in hearing aid packages. The external sound field influences the fluid motion within the package due to pressure gradients at the sound inlet ports. The airflow within the package is then be detected by the viscosity-driven fiber. This nanoscale fiber is, in essence, being used to replace the pressure-sensitive diaphragm used in conventional differential microphones.

A key difference between the present approach and the use of a conventional, pressure-sensitive diaphragm is that the fiber contributes essentially negligible mass and stiffness to the assembly; as can be seen in the analysis above, the moving mass is almost entirely composed of that due to the air in the package, and the stiffness is entirely negligible.

The detailed geometry of the package concept shown in FIG. 3 will no doubt, influence the field within it and, subsequently, the fiber motion.

The pressure and velocity within the package due to sound incident from any direction may be predicted, accounting for the effects of fluid viscosity and thermal conduction within the package [15, 13, 23, 16, 12, 18, 17, 19, 20, 24, 21, 22, 25, 14]. This analysis may be performed using a combination of mathematical methods and computational (finite element) approaches using the COMSOL finite element package.

The microphone packages may be fabricated, for example, through a combination of conventional machining and/or the use of additive manufacturing technologies.

A wire or fiber that is sufficiently thin can behave as a nearly ideal sound sensor since it moves with nearly the same velocity as the air over the entire audible range of frequencies. It is possible to employ this wire in a transducer to obtain an electronic voltage that is in proportion to the sound pressure or velocity.

In addition to capacitive sensing and optical/laser sensing, an extremely convenient and proven method of converting the fiber's velocity into a voltage is to use electrodynamic detection. The open circuit voltage across a conducting fiber or wire while the fiber moves relative to a magnetic field is measured. The output voltage is proportional to the velocity of the conductor relative to the magnet. The conductor should, ideally, be oriented orthogonally to the magnetic field lines as should the conductor's velocity vector.

The fiber or wire may be supported on a neodymium magnet which creates a field in the vicinity of the fiber or wire. Assume the magnetic flux density B of the field orthogonal to the fiber or wire is reasonably constant along the wire length L; the open circuit voltage between the two ends of the fiber or wire may be expressed as $$V_o = BLV \tag{15}$$

The velocity V is obtained by averaging the velocity predicted by equation (8) over the length of the fiber or wire, and $V_o$ is the open circuit voltage.

FIG. 4 shows the measured transfer function between the output voltage and the acoustic particle velocity (m/s) due to the incident sound pressure as a function of frequency. The output signal is clearly a very smooth function of frequency over most of the audible range. These results demonstrate that a nanofiber microphone can provide excellent frequency response, overcoming the adverse effects of the strong frequency dependence inherent in pressure gradient-based directional sensors as illustrated in FIG. 1.

Because the overall sensitivity of the acoustic velocity sensor (in volts/pascal) will be proportional to the BL product in equation (15), this product may be the most important parameter after selecting a suitably diminutive diameter of the fiber. This product should be as large as is feasible. Neodymium magnets are available that can create a flux density of B≈1 Tesla. This leaves us with the choice of L, the overall length of the fiber.

Since the electrical sensitivity is proportional to the overall fiber length, the motivation is to let this be as large as possible. However, there are adverse effects due to choosing excessively large values of L. To estimate the BL product that would be appropriate for the sensor design, it is helpful to cast equation (15) in the form of the predicted overall sensitivity in volts/pascal, as is common in the design of microphones. To do this, assume that the goal is to detect a plane sound wave in which the relationship between the pressure and acoustic particle velocity is $V=\rho_0 c \approx 415$ pascal x sec/meter where $\rho_0$ is the nominal air density and c is the speed of sound wave propagation. Assume that the fiber is small enough that its velocity is identical to that of the air. The acoustic sensitivity may then be written as $$\frac{V_o}{P} = H_{PV} = \frac{BL}{\rho_0 c} \text{ volts/pascal} \tag{16}$$

The sensitivity should be high enough that low-level sounds will not be buried in the noise of the electronic interface. Assume that the readout amplifier has an input-referred noise power spectral density of approximately $G_{NN} \approx (10\ \text{nV}/\sqrt{\text{Hz}})^2$. This statistic is typically reported as the square root of the power spectral density with units of $\text{nV}/\sqrt{\text{Hz}}$. This is a typical value for current low-noise operational amplifiers.

The noise floor design goal of 30 dBA corresponds to a pressure spectrum level (actually the square root of the power spectral density) of approximately $\approx G_{PP}=10^{-5}$ pascals/$\sqrt{\text{Hz}}$. Knowing the noise floor of the electronic interface of $\sqrt{G_{NN}}=10$ nV/$\sqrt{\text{Hz}}$, and the acoustic noise floor target of $\sqrt{G_{PP}}=10^{-5}$ pascals/$\sqrt{\text{Hz}}$ enables us to estimate the required sensitivity so that the minimum sound level can be detected, $$H_{PV} = \frac{10 \times 10^{-9}}{10^{-5}} \text{ volts/pascal} = 10^{-3} \text{ volts/pascal} \tag{17}$$

Assume that a magnetic flux density of B=1 Tesla can be achieved; the above results enable us to estimate $$L \approx 10^{-3} \frac{\rho_0 c}{B} \approx 0.415 \text{ m.}$$

If the length of conductor can be incorporated into a design, the sensor could achieve a noise floor of 30 dBA, based on the assumed electronic noise. Of course, the conductor must be arranged in the form of a coil as in common electrodynamic microphones.

In addition to the noise in the electronic read-out circuit, the Gaussian random noise created by the fiber's electrical resistance should also be considered. In this case, assume that the fiber has a rectangular cross section with thickness h and width b. The resistor noise power spectral density may be estimated by $$G_{RR} = \frac{4K_B T \rho L}{bh} v^2/\text{Hz} \tag{18}$$

where $K_B$=1.38×10$^{-23}$ m$^2$ kg/(s$^2$K) is Boltzmann's constant, T is the absolute temperature, and ρ is the resistivity of the material. The voltage noise due to resistance is given by $4K_B TR$, where R is the resistance in Ohms. As the length L of the conductor is increased, the electrical sensitivity is increased as shown in equation (12) but the resistance noise is also increased, as shown in equation (13). To best sort out the design trade-off, it is important to estimate the sound input-referred noise of the system including both the amplifier noise and the sensor resistance noise. A 1 kΩ resistor produces a noise spectrum of 4 nV/√Hz. Since this 1 kΩ resistor would thus produce a noise signal that is comparable to the noise of the electronic interface, this resistance is taken as a target value for the total resistance of the fiber.

Assume that the fiber is made using a material having minimal resistivity such as graphene, the value of the radius that would lead to a 1 kΩ resistance may be estimated. Graphene has a resistivity of approximately ρ≈10$^{-8}$ Ωcm=10$^{-10}$ Ωm. For a given radius r and length L, the resistance is R=ρL/πr$^2$. The minimum radius that could be used with a corresponding fiber length is then $$r \approx \sqrt{\frac{\rho L}{\pi R}} \approx \sqrt{\frac{10^{-10} \times 0.415}{\pi \times 1000}} \approx 115 \text{ nm} \tag{19}$$

It is important to note that if a smaller radius is desired, a number of fibers could be employed in parallel where each had a significantly smaller radius. Also note that this radius is on the order of that needed to achieve a reasonably flat frequency response as shown in FIG. 7.

Based on this approximate, preliminary investigation, a design for a microphone having a flat frequency response over the audible range and have a noise floor of roughly 30 dBA is provided. Because the microphone responds to acoustic particle velocity rather than pressure, the response will have a first-order directionality over the entire audible frequency range.

An analysis of the random thermal noise of the fiber due to the temperature of the surrounding gas was conducted [41, 40]. Thermal noise concerns will place limits on the total volume of the sensor, since the fiber must effectively sample the average motion of a large number of gas molecules within the sound field. Preliminary calculations suggest that thermal noise will be significant if the volume of air within the package becomes less than approximately 1 mm$^3$.

Because the noise signals from the amplifier and the resistance are uncorrelated, the power spectral density of the voltage resulting from the sum of these two signals may be computed by adding the individual power spectral densities. The input sound pressure-referred noise power spectral density may then be estimated from $$G_{PP} = \frac{G_{NN} + G_{RR}}{|H_{PV}|^2} = (\rho_0 c)^2 \frac{G_{NN} + \frac{4K_B T \rho L}{bh}}{|BL|^2} \text{ pascal}^2/\text{Hz} \tag{20}$$

Equation (20) shows that the overall noise performance is clearly strongly dependent on increasing BL. As L is increased the resistance will also increase and may cause $G_{RR}$ to be greater than $G_{NN}$. If this is true $G_{NN}$ may be neglected, so that equation (20) becomes $$G_{PP} = \frac{G_{RR}}{|H_{PV}|^2} = (\rho_0 c)^2 \frac{\frac{4K_B T \rho L}{bh}}{|BL|^2} = (\rho_0 c) \frac{4K_B T \rho}{B^2 Lbh} \text{ pascal}^2/\text{Hz} \tag{21}$$

Equation (20) clearly shows that the noise performance is improved as the total volume of the conductor, Lbh is increased. Each of the three dimensions, L, b, and h has equal impact on the noise floor. The thickness h, however, should be kept small enough that the bending stiffness not significantly influence the response.

The A-weighted noise floor in decibels may then be estimated from $$SPL_A \approx 135.2 + 10\log_{10}\left((\rho_0 c)^2 \frac{4K_B T \rho}{B^2 Lbh}\right) \approx -9.08 + 10\log_{10}\left(\frac{\rho}{Lbh}\right) \tag{22}$$

This convenient formula provides an estimate of the sound input-referred noise floor of a design in terms of the four primary design parameters, the fiber resistivity p, and its overall dimensions L, b, and h. The noise floor is improved by approximately 3 dB for each doubling of L, b, and h, and for each time the resistivity is halved. To consider a specific design, assume that the conductor is a typical metal having a resistivity of ρ≈2.6×10 Ωm. In practice, a number of thin fibers may be arranged in parallel, so that the overall fiber volume is Lbh. Setting the length to be L≈0.415 m, and the thickness to be h≈0.5 μm, leads to a total width of the collection of fibers to be b≈14.5 μm. If the thickness h is held to be constant, the area of the conducting material is b×L≈6×10$^{-6}$ m$^2$. The minimum dimensions of the conductor could be 3 mm by 2 mm, which is compatible with hearing aid packages. There will, of course, be additional material required in the packaging which will increase the overall size.

In miniature microphones, the noise floor is often strongly influenced by the thermal excitation of the microphone diaphragm. An approximate analysis of the thermal noise of the present microphone concept may be constructed by first assuming that the fiber moves with the surrounding air in an ideal way. When the system is in thermal equilibrium, the energy imparted by the thermally excited gas is equal to the kinetic energy of the air in the vicinity of the fiber, ½ $K_B$T=½mE[V$^2$], where $K_B$=1.38×10 m kg/(s$^2$K) is Boltzmann's constant, T is the absolute temperature, m is the mass of the air that moves with the fiber and E[V$^2$] is the mean square of the fiber's velocity. For a plane wave, since P=V$\rho_0$c, this leads to $$m = \frac{K_B T (\rho_0 c)^2}{E[P^2]}, \tag{23}$$

where E[P$^2$] is the mean square pressure. If the fibers in the sensor move with a total amount of air having mass m, the thermal noise floor will have a mean square pressure of E[P$^2$]. The sound pressure level corresponding to this mean square pressure is $SPL_{thermal}$=10 log$_{10}$(E[P$^2$]/$P^2_{ref}$), where $P_{ref}$=20×10$^{-6}$ pascals is the standard reference pressure. For a thermal noise floor of 30 decibels, equation (23) then gives the total air mass of m≈1.74×10$^{-9}$ kg (25)

This corresponds to a cubic volume of air with each side having dimensions of approximately 1 mm. This provides a rough estimate of the minimum size of any microphone that will achieve a desired thermal noise floor. It is well known that as the size of the microphone is reduced, the thermal noise increases. The sensor must effectively detect the average of the random motions of a very large number of molecules to eliminate the random molecular vibrations in the gas.

In order to provide a suitable fiber, PMMA fibers may be electrospun, and then metallized, to provide the desired low resistivity.

An alternate material for the fiber is a carbon nanotube or carbon nanotube structure, which can be produced as single wall carbon nanotube (SWCNT) structures, or multi-walled carbon nanotubes (MWCNT) e.g., layered structures, and may be aggregated into a yarn of multiple tubes. Carbon nanotubes are highly conductive and strong, and can be made to have very high length to diameter ratios, e.g., up to 132,000,000:1 (see, en.wikipedia.org/wiki/Carbon_nanotube, see Wang, X.; Li, Qunqing; Xie, Jing; Jin, Zhong; Wang, Jinyong; Li, Yan; Jiang, Kaili; Fan, Shoushan (2009). "Fabrication of Ultralong and Electrically Uniform Single-Walled Carbon Nanotubes on Clean Substrates". Nano Letters. 9 (9): 3137-3141. Bibcode:2009NanoL.9.3137 W. doi: 10.1021/n1901260b. PMID 19650638; Zhang, R.; Zhang, Y.; Zhang, Q.; Xie, H.; Qian, W.; Wei, F. (2013). "Growth of Half-Meter Long Carbon Nanotubes Based on Schulz-Flory Distribution". ACS Nano. 7 (7): 6156-61. doi:10.1021/nn401995z. PMID 23806050)

A design is shown in FIG. 5 that has been developed for a circuit board that can be used to construct, in effect, a coil of fiber having the desired length and effective area according to this approximate design.

A pair of these microphones may be used to achieve a second order directional response. This may, for example, involve merely subtracting the outputs from the pair since each one will have a first order directional response.

According to another embodiment, a plurality of fibers are arranged in a spatial array. By aligning the axis of the fiber and spacing of a plurality of fibers, a physical filter is provided which can respond to particular oscillating vector flow patterns within the space. For example, the array may provide a high Q frequency filter for wave patterns within the space. Because the filaments are sensitive for viscous drag along defined axes, and spatial locations, the filter/sensor may be angularly sensitive and phase sensitive to acoustic waves and flow patterns. For waves of high spatial frequency with respect to the fiber, the fiber may itself move in opposite directions with respect to the magnetic field, providing cancellation. Further, the magnetic field itself need not be spatially uniform, permitting an external control over the response. In one case, the magnetic field is induced by a permanent magnet, and thus is spatially fixed. In another case, the field may be induced by a controlled magnetic or electronic array (which itself may be electronically or mechanically modulated).

In a microphone embodiment, these techniques may be used to provide a tuned spatial and frequency sensitivity. Further, where a plurality of fibers are connected in series for the array, it is also possible to use electronic switches, e.g., CMOS analog transmission gates, to electronically control the connection pattern. Therefore, the array may be operated in a multiplexed mode, where a plurality of patterns may be imposed essentially concurrently, if the sampling frequency of the switched array is above the Nyquist frequency of the acoustic waves.

According to another embodiment, the fiber(s) are part of a closed loop feedback system for control of a sonic emitter or fluid oscillation generator, such as a loudspeaker. Note that the system may have a response well beyond the human audible frequency range of about 20 Hz to 20 kHz, and for example may extend from <0.1 Hz to 100 kHz, for example, while still operating within the design constraints discussed herein. According to one embodiment, a wave cancellation technology is implemented that cancels waves in an axially sensitive manner, for example using a phased array transducer to generate the cancelling wave(s). Further, according to another embodiment, the fibers are configured as a metamaterial, wherein the sensed motions are re-emitted along a different math, or optionally with modifications. The metamaterial may be passive, with corresponding relatively low efficiencies, or active, with amplifiers to provide controlled gain, e.g., a unity gain or higher. For example, this would permit an acoustically transparent object which does not itself conduct or pass sound. Other applications for metamaterials are known.

While a preferred system employs an induced voltage on a conductor moving within a magnetic field, optical sensing may be provide within some embodiments of the invention. Likewise, other known method of sensing fiber vibration may also be employed.

It is therefore an object according to one embodiment to provide a microphone design having a first order directionality with flat frequency response.

It is also an object according to another embodiment to provide a microphone having passive, powerless operation.

It is a further object to provide a microphone design having zero aperture size, i.e., no need for the use of two separated sound inlet ports.

It is a still further object to provide a microphone design which permits fabrication at extremely low cost.

It is another object to provide a microphone design which can be miniaturized to be approximately the same size as existing hearing aid microphones, i.e., a package side of less than 2.5 mm×2.5 mm.

It is a still further object to provide a microphone design which has estimated noise floor of approximately 30 dBA.

It is also an object to provide a sensor, comprising: at least two spaced electrodes having a space proximate to the at least two electrodes containing a fluid subject to perturbation by waves; and at least one conductive fiber, connected to the at least two electrodes and surrounded by the fluid, each respective conductive fiber being configured for movement within the space with respect to an external magnetic field, each respective conductive fiber having a radius and length such that a movement of at least a portion of the conductive fiber substantially corresponds to movement of the fluid surrounding the conductive fiber along an axis normal to the respective conductive fiber. The waves may be acoustic waves, and the sensor may be a microphone.

The space may be confined within a wall, the wall having at least one aperture configured to pass the waves through the wall.

The external magnetic field may be at least 0.1 Tesla, at least 0.2 Tesla, at least 0.3 Tesla, at least 0.5 Tesla, at least 1 Tesla, or may be the Earth's magnetic field.

The external magnetic field may be substantially constant over the length of the conductive fiber. Alternately, the external magnetic field may vary substantially over the length of the conductive fiber. The external magnetic field may undergo at least one inversion over the length of the conductive fiber. The external field may be dynamically controllable in dependence on a control signal. The external field may have a dynamically controllable spatial pattern in dependence on a control signal.

The at least one conductive fiber may comprise a plurality of conductive fibers, wherein the external magnetic field is substantially constant over all of the plurality of conductive fibers. The at least one conductive fiber may comprise a plurality of conductive fibers, wherein the external magnetic field surrounding at least one conductive fiber varies substantially from the external magnetic field surrounding at least one other conductive fiber. The at least one conductive fiber may comprise a plurality of conductive fibers, having a connection arrangement controlled by an electronic control. The at least one conductive fiber may comprise a plurality of conductive fibers at different spatial locations, interconnected in an array, and wherein the external field may be dynamically controllable in time and space in dependence on a control signal.

A conductive path comprising the at least one conductive fiber, between a respective two of the at least two electrodes, within the external magnetic field, may be coiled.

The at least one conductive fiber may comprise a metal fiber, a polymer fiber, a synthetic polymer fiber, a natural polymer fiber, an electrospun polymethyl methacrylate (PMMA) fiber, a carbon nanotube or other nanotube, a protein-based fiber, spider silk, insect silk, a ceramic fiber, or the like.

The at least two electrodes may comprise a plurality of pairs of electrodes connected in series.

Each respective the conductive fiber may have a free length (i.e., available for viscous interaction with a surrounding liquid or gas medium) of at least 10 microns, at least 50 microns, at least 100 microns, at least 500 microns, at least 1 mm, at least 2 mm, at least 3 mm, at least 5 mm, at least 1 cm, at least 2 cm, at least 3 cm, at least 5 cm, at least 10 cm, at least 20 cm, at least 30 cm, at least 40 cm, at least 50 cm, at least 75 cm, or at least 100 cm, between the at least two electrodes.

The at least one conductive fiber may have a diameter of less than 10 μm, less than 6 μm, less than 4 μm, less than 2.5 μm, less than 1 μm, less than 0.8 μm, less than 0.6 μm, less than 0.5 μm, less than 0.4 μm, less than 0.33 μm, less than 0.3 μm, less than 0.22 μm, less than 0.1 μm, less than 0.08 μm, less than 0.05 μm, less than 0.01 μm, or less than 0.005 μm.

The sensor may be an acoustic sensor having a noise floor of at least 30 dBA, at least 36 dBA, at least 42 dBA, at least 48 dBA, at least 54 dBA, at least 60 dBA, at least 66 dBA, at least 72 dBA, at least 75 dBA, or at least 78 dBA, when the signal from the electrodes in response to a 100 Hz acoustic wave is amplified with an amplifier having a noise of 10 nV/√Hz, for example with an external magnetic field at least 0.2 Tesla. Other measurement conditions of noise floor may also be employed.

The space may be confined within a wall, the space having a largest dimension less than 5 mm, and the at least one conductive fiber has an aggregate length of at least 15 cm, at least 20 cm, at least 25 cm, at least 30 cm, at least 40 cm, or at least 50 cm.

The at least one conductive fiber may comprise a plurality of conductive fibers, each having a length of about 3 mm and a diameter of about 0.6 μm.

The external magnetic may have a periodic temporal variation, further comprising an amplifier synchronized with the periodic temporal variation. The external magnetic may have a periodic spatial variation.

It is another object to provide a sensor, comprising: at least one fiber, surrounded by a fluid, each respective fiber being configured for movement within the space, and having an associated magnetic field emitted by the respective fiber, each fiber having a radius and length such that a movement of at least a portion of the fiber approximates the perturbation by waves of the fluid surrounding the fiber along an axis normal to the respective conductive fiber; and a magnetic field sensor, configured to sense a movement of the at least one fiber emitting the associated magnetic field, based on a sensed displacement of a source of the magnetic field.

It is a further object to provide a method of sensing a wave in a fluid, comprising: providing a space containing a fluid subject to perturbation by waves, the space being permeated by a magnetic field; providing at least one conductive fiber, surrounded by the fluid, each respective conductive fiber being configured for movement within the space in response to the waves with respect to the magnetic field, and having a radius and length such that a movement of at least a portion of the conductive fiber approximates the perturbation of the fluid surrounding the conductive fiber by the waves along an axis normal to the respective conductive fiber; and sensing an induced electric signal on the at least one conductive fiber as a result of the movement within the magnetic field.

It is also an object to provide an active metamaterial, comprising: a plurality of conductive fibers, each configured for movement within a fluid-filled space in response to fluid waves, with respect to a magnetic field, each having a radius and length such that a movement of at least a portion of the respective conductive fiber approximates the perturbation of the fluid surrounding the respective conductive fiber by the waves along an axis normal to the respective conductive fiber; at least one amplifier, configured to sense an electrical signal responsive to the movement of the plurality conductive fiber within the magnetic field; a processor configured to perform a time and space transform on the electrical signal; and a phased array transducer, responsive to the processor, configured to emit waves within a portion of the fluid. The phased array transducer may have an emission pattern which does not directly emit waves toward the plurality of conductive fibers. The phased array transducer may have an emission pattern which emits waves that may be at least one of directly and indirectly sensed by at least one of the plurality of conductive fibers. The plurality of fibers may surround a core which interferes with fluid wave propagation in the fluid surrounding the core, with the plurality of fibers arranged in an array around the core to sense at least an axis of propagation of the fluid wave, and the phased array transducer disposed on at least an opposite side of the core from the plurality of fibers. The processor may be further configured to drive the phased array to emulate a core which may be transparent with respect to the fluid waves. Other metamaterial characteristics may be provided, including emulation of negative index of refraction, amplification, or other spatial and/or temporal patterns.

A further object provides a metamaterial comprising: a plurality of acoustic vector field sensors, each configured to sense an acoustic vector field of a fluid within a fluid-filled space in response to fluid waves, and producing an electrical signal corresponding to the sensed acoustic vector field; a processor configured to perform a time and space transform on the electrical signal; and an output, configured to communicate a control signal for at least one phased array transducer, the control signal being defined to cause the at least one phased array transducer to emit fluid waves according to a defined acoustic vector field pattern dependent on a result of the time and space transform, within a portion of the fluid. The metamaterial may further comprise the at least one phased array transducer, configured to receiver the control signal, emit the fluid waves according to the defined acoustic vector field pattern dependent on the result of the time and space transform, within the portion of the fluid. The phased array transducer may have an emission pattern which does not directly emit waves toward the fluid vector flow sensors, or one which emits waves that are at least one of directly and indirectly sensed by at least one of the fluid vector flow sensors. Typically, the phased array will be provided as a regular array of transducers in a repeating spatial pattern. However, the array may also be irregular, non-repeating, or have a complex geometry. Further, in some cases, the transducers may be displaceable, such that no a prior presumption of the spatial relationship of the transducers may be assumed, and therefore the algorithm performed by the processor may require feedback, which may be explicit or implicit, over the spatial relationships. In some cases, sensing transducers may be coupled with emitting transducers, and for example provided as modules. In other embodiments, the sensing and transducing systems are separate. Typically, the sensors and the emitters will be physically proximate, to sense and control the same fluid media.

The time and space transform may cause a transfer function of an acoustic wave from the plurality of acoustic vector field sensors to the control signal to approximate a metamaterial transfer function. For example, even in the case of a complex shape, the metamaterial may have externally observed homogeneous properties. The time and space transform may cause a transfer function of an acoustic wave from the plurality of acoustic vector field sensors to the control signal to approximate an acoustic cloaking device transfer function, or a 3D acoustic cloaking device transfer function. On the other hand, the metamaterial may act as a retroreflector, or any arbitrary or programmed 2D or 3D transfer function between input waves sensed and emitted waves produced.

The plurality of acoustic vector field sensors may comprise a plurality of fibers, each fiber being configured for movement within a fluid-filled space in response to fluid waves, each fiber having a radius and length such that a movement of at least a portion of the respective fiber approximates the perturbation of the fluid surrounding the respective fiber by the waves along an axis normal to the respective fiber.

The metamaterial may further comprise a system including a phased array transducer configured to receive the control signal and to emit the fluid waves, and a self-contained power supply configured to supply sufficient power to the phased array transducer to continually emit the fluid waves over a period of time comprising at least 1, 2, 3, 4, 5, 6, 7, 8, 9, 10, 20, 30, 60, 300, 500, 1200, or 3600 seconds, wherein the plurality of acoustic vector field sensors are configured to concurrently sense the acoustic vector field of the fluid within the fluid-filled space with the emission of fluid waves in the fluid-filled space by the phased array transducer. The power source may be a battery, fuel cell, internal combustion engine, compressed fluid supply, solar power source, wind power source, energy harvesting power source, or other type.

The fluid vector flow sensors may surround a core which interferes with fluid wave propagation in the fluid surrounding the core; and the fluid vector flow sensors may be arranged in an array around the core to sense at least an axis of propagation of the fluid wave. A phased array transducer may be provided to emit the fluid waves within the portion of the fluid, disposed on at least an opposite side of the core from the fluid vector flow sensors; wherein the processor is further configured to drive the phased array to emulate a core which is transparent with respect to the fluid waves. As discussed above, the metamaterial may act as a homogeneous material with defined bulk properties, and thus the "sides" of the metamaterial may be defined based on the particular wave propagation vector. The time and space transform may therefore have a metamaterial transfer function between the fluid vector flow sensors and the output.

It is also an object to provide a metamaterial method, employing a plurality of fibers as fluid vector flow sensors, each configured for movement within a fluid-filled space in response to fluid waves, each having a radius and length such that a movement of at least a portion of the respective fiber approximates the perturbation of the fluid surrounding the respective fiber by the waves along an axis normal to the respective fiber, the metamaterial method comprising: receiving an electrical signal responsive to the movement of the plurality fibers from the fluid vector flow sensors; performing a time and space transform on the electrical signal with an automated transform processor; and emitting a control signal for a plurality of transducers, e.g., a phased array transducer, to emit fluid waves within a portion of the fluid responsive to a result of the time and space transform. The phased array transducer may have an emission pattern which does not directly emit waves toward the fluid vector flow sensors, under at least a state of operation. The phased array transducer may have an emission pattern which emits waves that are at least one of directly and indirectly sensed by at least one of the fluid vector flow sensors. This permits closed loop feedback operation.

In one embodiment, the fluid vector flow sensors surround a core which interferes with fluid wave propagation in the fluid surrounding the core; the fluid vector flow sensors are arranged in an array around the core to sense at least an axis of propagation of the fluid wave; the phased array transducer is disposed on at least an opposite side of the core from the fluid vector flow sensors; and the phased array is driven to emulate a core which is transparent with respect to the fluid waves.

Another object provides a computer readable medium containing non-transitory instructions for controlling an active metamaterial control system, receiving inputs from a plurality of fibers as fluid vector flow sensors, each configured for movement by viscous drag within a fluid-filled space in response to fluid waves, each having a radius and length such that a viscous drag-induced movement of at least a portion of the respective fiber approximates the perturbation of the fluid surrounding the respective fiber by the waves along an axis normal to the respective fiber, the active metamaterial control system being controlled in dependence on the non-transitory instructions comprising instructions to: receive an electrical signal responsive to the movement of the plurality fibers from the fluid vector flow sensors; perform a time and space transform on the electrical signal with an automated transform processor; and produce a control signal to control emission of fluid waves within a portion of the fluid by a plurality of fluid flow inducing transducers, responsive to a result of the time and space transform. The non-transitory instructions may further comprise instructions to cause the phased array transducer to produce an emission pattern which emits waves that are at least one of directly and indirectly sensed by at least one of the fluid vector flow sensors, and the time and space transform comprises a metamaterial transform.

A standard (general purpose) computer, executing computer readable instructions stored on a non-transitory computer readable medium, may be used to implement the control logic. Alternately, a RISC. CISM, SIMD (e.g., GPU type processor), MIMD, or other processor may be provided. The processor may implement various spatial transforms, such as FFT and IFW, and/or wavelet transforms, or other general or customized transforms or other processing. The phased array is dependent on the fluid medium (e.g., air, water, hydraulic fluid, etc.), the amplitude desired, spatial resolution/wavelength, etc., and such arrays are of known type. For example, voice-coil speakers, piezoelectric transducers, electrostatic transducers, etc. may be formed in an array and driven accordingly.

In some cases, the metamaterial properties may be defined by a neural network or deep neural network trained based on examples of the properties sought. For example, if the metamaterial is desired to have hybrid properties of a set of different physical objects (which may differ in material, homogeneity, mechanical configuration, basic material properties), using a training algorithm that achieves the hybrid result, which, for example, is not available or even possible with a natural material. In other cases, statistical and matrix transform algorithms may be used to explicitly define the metamaterial properties. On the other hand, if the properties are fully defined, a self-adaptive training algorithm, such as including a genetic algorithm, may be used to define the time and space transfer function that allows the metamaterial to best o optimally achieve the desired properties.

BRIEF DESCRIPTION OF THE DRAWINGS

FIG. 19 shows a flowchart of a method according to the present invention.

DETAILED DESCRIPTION OF THE INVENTION

Example 1

In order to verify the results of the analytical model for an acoustic sensor, measurements were obtained of the response of a thin wire due to a plane wave sound field. Stainless steel fiber having a diameter of 6 μm was obtained from Blue Barn Fiber (Hayden, Idaho) [72]. This is intended to be spun into yarn for clothing. The fiber is in the form of continuous strands having a length of several centimeters.

A single strand of stainless steel fiber was soldered to two wires spanning a distance of 3 cm. The fiber was not straight, in this experiment, which may influence the ability to accurately predict its sound-induced motion. The fiber was placed in an anechoic chamber and subjected to broad-band sound covering the audible range of frequencies. The sound pressure was measured in the vicinity of the wire using a B&K 4138⅛th inch reference microphone. The sound source was 3 meters from the wire which resulted in a plane sound wave at frequencies above approximately 100 Hz. Knowing the sound pressure in pascals, one can easily estimate the fluctuating acoustic particle velocity through equation (2).

Figure 1:
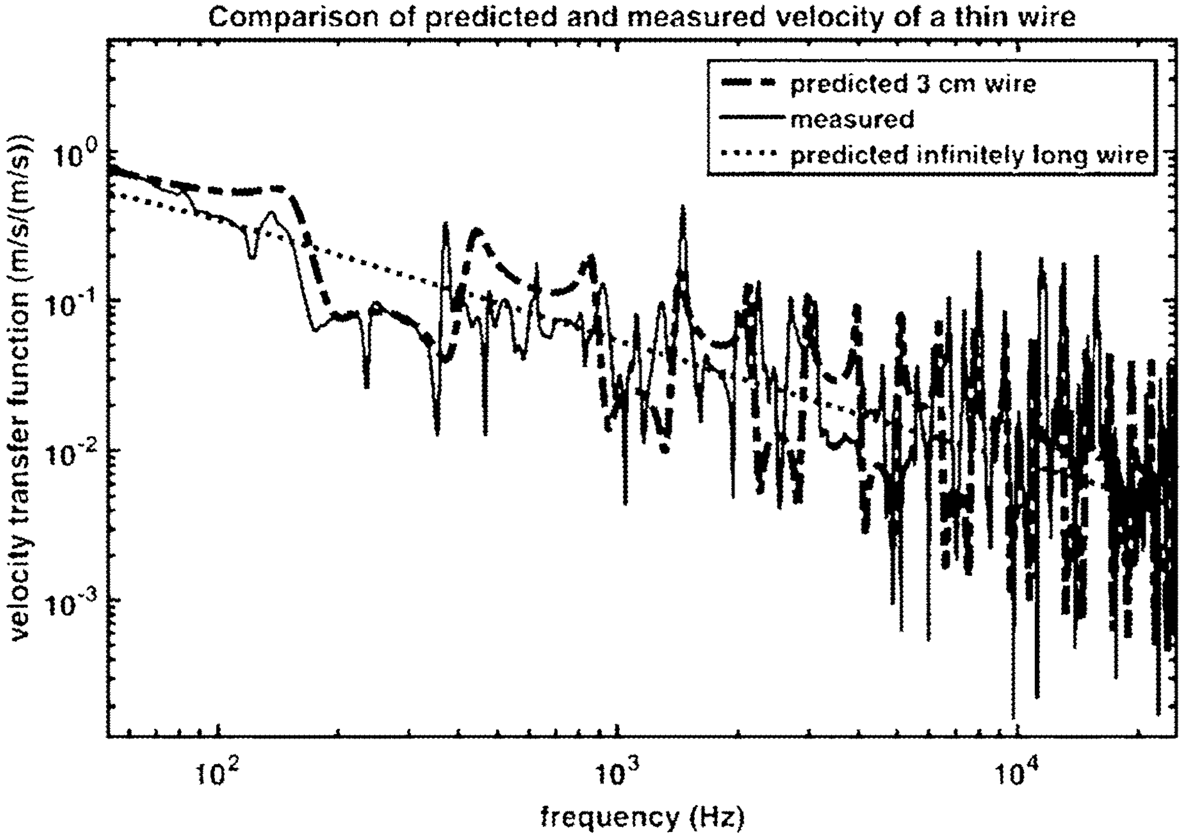
FIG. 1 shows predicted and measured velocity of 6 μm diameter fibers driven by sound.

FIG. 1 shows comparisons of measured results with those predicted using equation (14). The response is found to vary with frequency but the general behavior of the curves show qualitative agreement. Predicted results based on an infinitely long, unsupported fiber, obtained using equation (12), $$\frac{V_l}{U} = \frac{C(\omega) + \hat{\imath}\omega M(\omega)}{C(\omega) + \hat{\imath}\omega\left(M(\omega) + \rho_m \pi r^2\right)}.$$

In this case, the general slope of the curve versus frequency is consistent with the measured results but the absence of wave reflections from the supports causes the response to not account for resonances in the fiber. It should be emphasized that it was not attempted to accurately account for the boundary conditions of this thin fiber, and effects due to its curvature were neglected. Nonuniform behavior of the response over frequencies is most likely due to wave reflections (i.e., resonances) in the wire.

The general qualitative agreement between the measured and predicted results shown in FIG. 1 indicates that the analytical model described above provides a reasonable way to account for the dominant forces on and within the wire. Based on this, equation (14) is used to predict the effect of significantly reducing the fiber diameter. As discussed above, the viscous fluid forces are expected to dominate over all mechanical forces associated with the material properties of the wire when the diameter is reduced to a sufficient degree.

Figure 7:
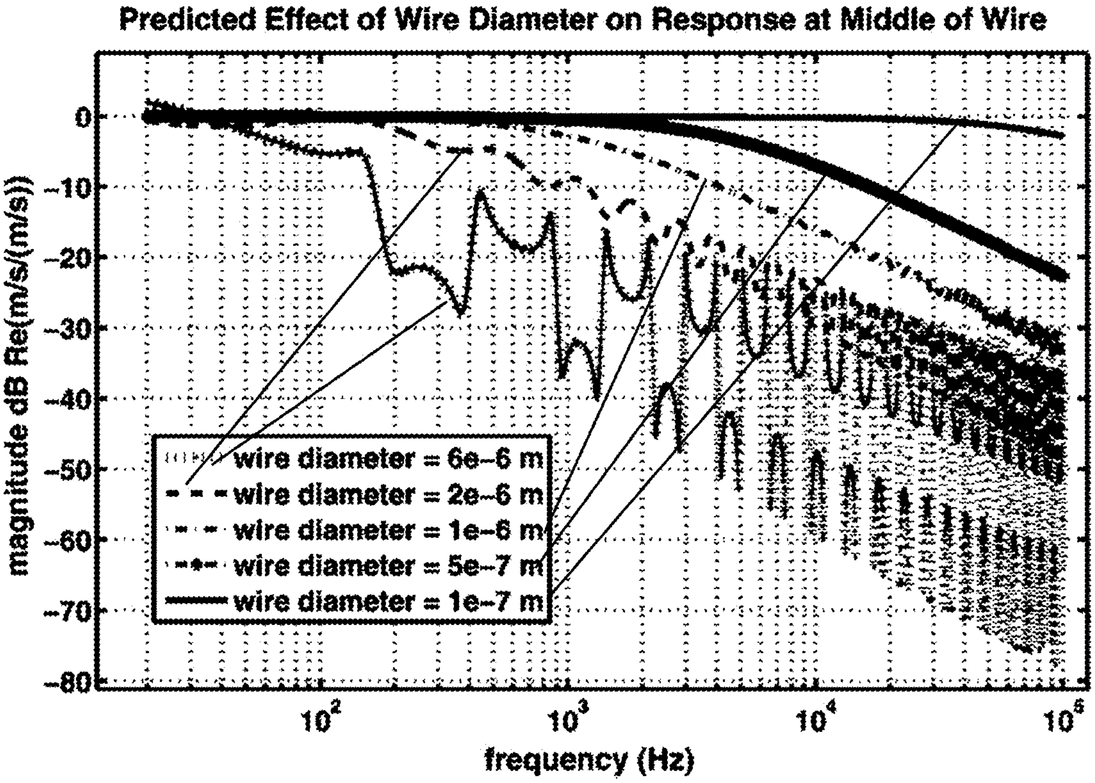
FIG. 7 shows the predicted effect of the diameter of a thin fiber or wire on the response due to sound at its mid-point.

The results of reducing the wire diameter on the predicted response to sound are shown in FIG. 7. The figure shows the amplitude (in decibels) of the wire velocity relative to that of the air in a plane sound wave field. As expected, when the wire diameter is reduced to less than 1 μm, (i.e., on the nanoscale), the nature of the response changes significantly and resonant behavior appears to be damped out by the viscous fluid. The frequency response of the wire is nearly flat up to 20 kHz when the diameter is reduced to 100 nm.

FIG. 1 shows predicted and measured velocity of a 6 μm diameter fiber driven by sound.

Figure 2:
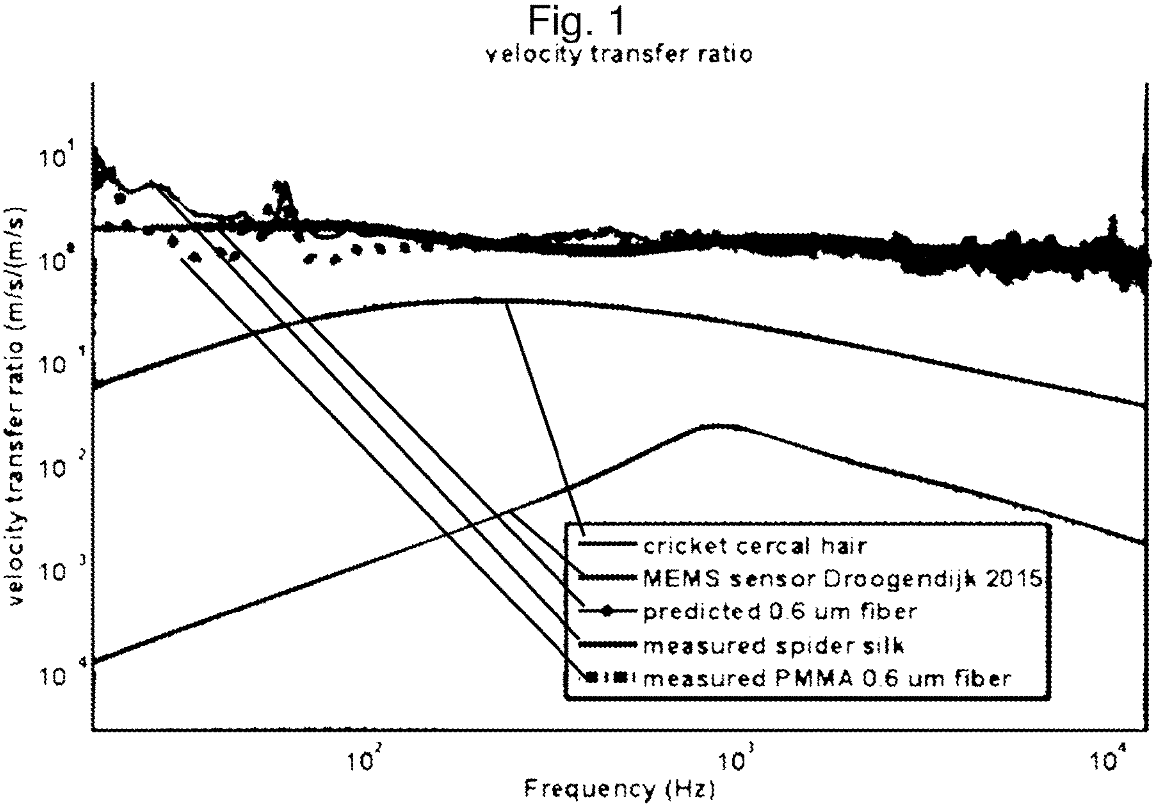
FIG. 2 shows predicted and measured velocity of thin fibers driven by sound show that the fibers motion is very similar to that of the air over a very wide range of frequencies.

FIG. 2 shows predicted and measured velocity of thin fibers driven by sound show that the fibers motion is very similar to that of the air over a very wide range of frequencies. Results are shown for man-made (PMMA) fiber along with those obtained using spider silk. This previously unexplored method of sensing sound will lead to directional microphones with ideal, flat frequency response.

Figure 3:
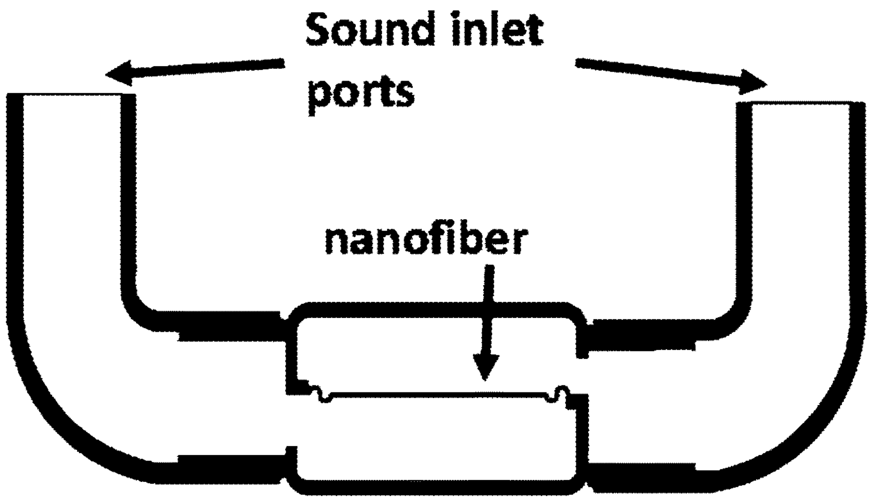
FIG. 3 shows a simplified schematic of a packaging for the nanofiber microphone
Figure 4:
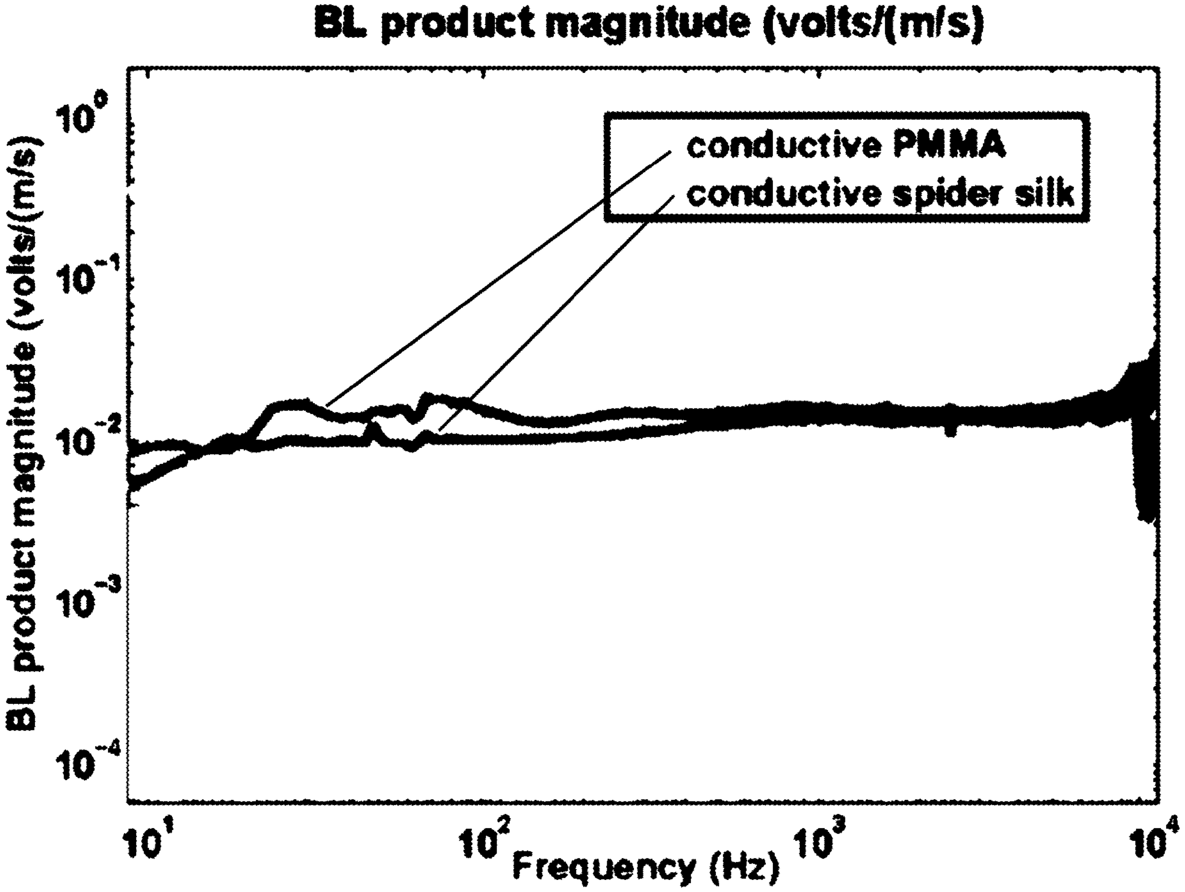
FIG. 4 shows that a nanofiber microphone achieves nearly ideal frequency response.

FIG. 3 shows a simplified schematic of a packaging for the nanofiber microphone FIG. 4 shows that a prototype nanofiber microphone achieves nearly ideal frequency response. Measured electrical sensitivity is shown for two prototype fibers as the micro-phone output voltage relative to the velocity of the air in a plane-wave sound field. Measurements were performed in the anechoic chamber. One fiber consists of natural spider silk which has been coated with a conductive layer of gold. The other is a man-made fiber electrospun using PMMA and also coated with gold. A magnet was placed adjacent to each fiber and the open circuit output voltage across the fibers were detected using a low noise SRS SR560 preamplifier. Each has a diameter of approximately 0.5 μm. The length of spider silk and PMMA is about 3 cm, and B is about 0.35 T based on a finite element model of the magnetic field shown in FIG. 4. This gives BL≈0.01 volts/(m/s), in close agreement to that shown here.

Figure 8:
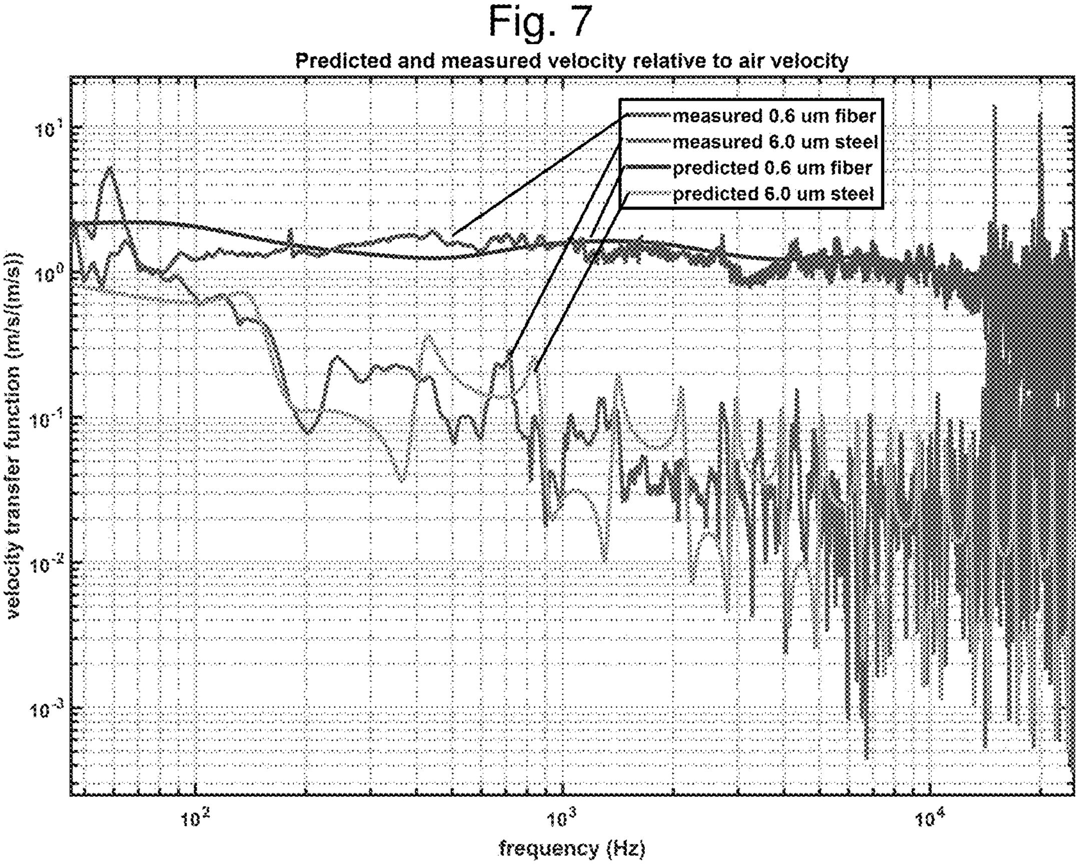
FIG. 8 shows that, when the diameter of the fiber is reduced sufficiently, the response becomes nearly independent of frequency.

An experimental examination of the effect of reducing the fiber diameter was conducted using PMMA fiber that is approximately 600 nm in diameter and 3 mm long. It thus is about one tenth the size of the steel wire discussed supra. The Young's modulus has been estimated to be approximately 2.8×10 N/m$^2$ and the density is approximately 1200 kg/m$^3$. The results are shown in FIG. 8 along with those shown in FIG. 1 for comparison. FIG. 8 also shows predicted results for this PMMA fiber based on equation (14). FIG. 8 shows that equation (14) accurately predicts that this factor of 10 reduction in fiber diameter results in nearly ideal flat response as a function of frequency.

The results indicate that a wire that is sufficiently thin can behave as a nearly ideal sound sensor since it moves with nearly the same velocity as the air over the entire audible range of frequencies. It should therefore be possible to employ this wire in a transducer to obtain an electronic voltage that is in proportion to the sound pressure or velocity.

FIG. 7 shows the predicted effect of the diameter of a thin fiber or wire on the response due to sound at its mid-point (x=L/2). The wire is assumed to be 3 cm long and have a diameter of 6 μm. The material properties are chosen to represent stainless steel.

FIG. 8 shows that, when the diameter of the fiber is reduced sufficiently, the response becomes nearly independent of frequency. Measured and predicted results are shown for a PMMA fiber having a diameter of approximately 800 nm and length 3 mm. The results of FIGS. 1A and 1B are also shown for comparison.

Figure 9:
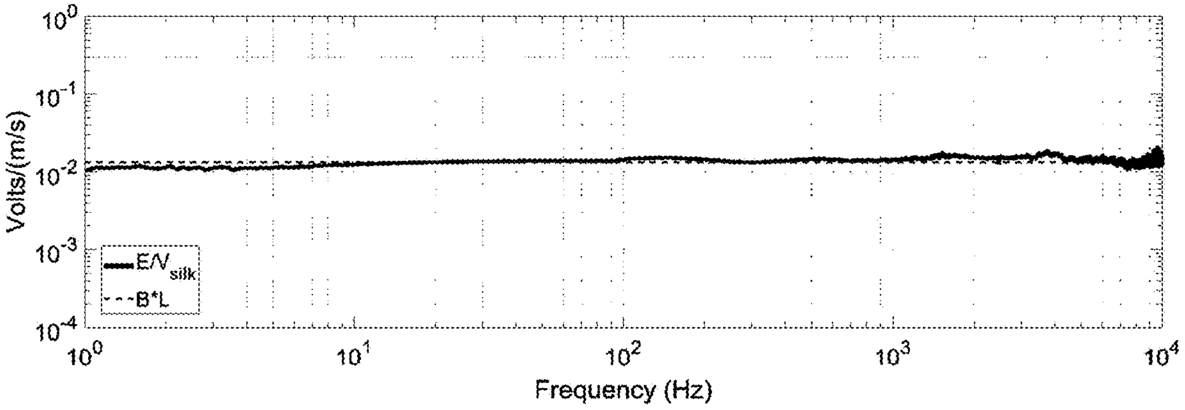
FIG. 9 shows predicted and measured electrical sensitivity of a prototype microphone, for a 3.8 cm length 500 nm conductive spider silk fiber.

FIG. 9 shows predicted and measured electrical sensitivity of a prototype microphone which employs a 3.8 cm length of conductive, 500 nm diameter spider silk fiber. The predicted results were obtained by computing the velocity of the fiber averaged over its length and multiplying this result by the estimated BL product of BL≈0.0063 volts-seconds/meter. For the fiber of length 3.8 cm, this corresponds to a magnetic flux density of B≈0.2 Teslas (estimate for the neodymium magnet used in this experiment). No attempt was made to optimize the placement of the wire to maximize the magnetic flux density. The wire is attached to two supporting wires, which are then taped to the neodymium magnet. The measured results show qualitative agreement with the predictions up to a frequency of about 2 kHz. Above this frequency the noise in the measured signal dominates.

Figure 10:
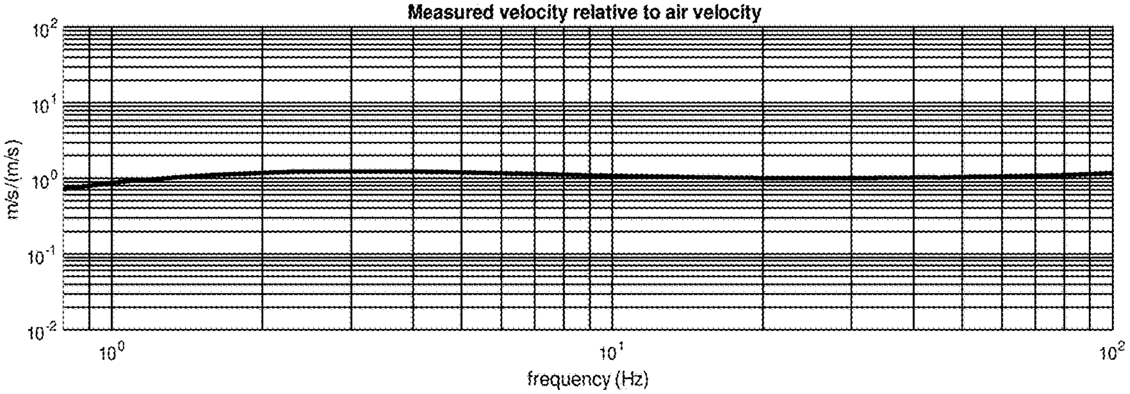
FIG. 10 shows the measured velocity of thin fibers driven by sound show that the fibers motion is very similar to that of the air in the low frequency range 0.8 Hz to 100 Hz.

FIG. 10 shows the measured velocity of thin fibers driven by sound show that the fibers motion is very similar to that of the air in the low frequency range 0.8 Hz to 100 Hz.

Figure 11:
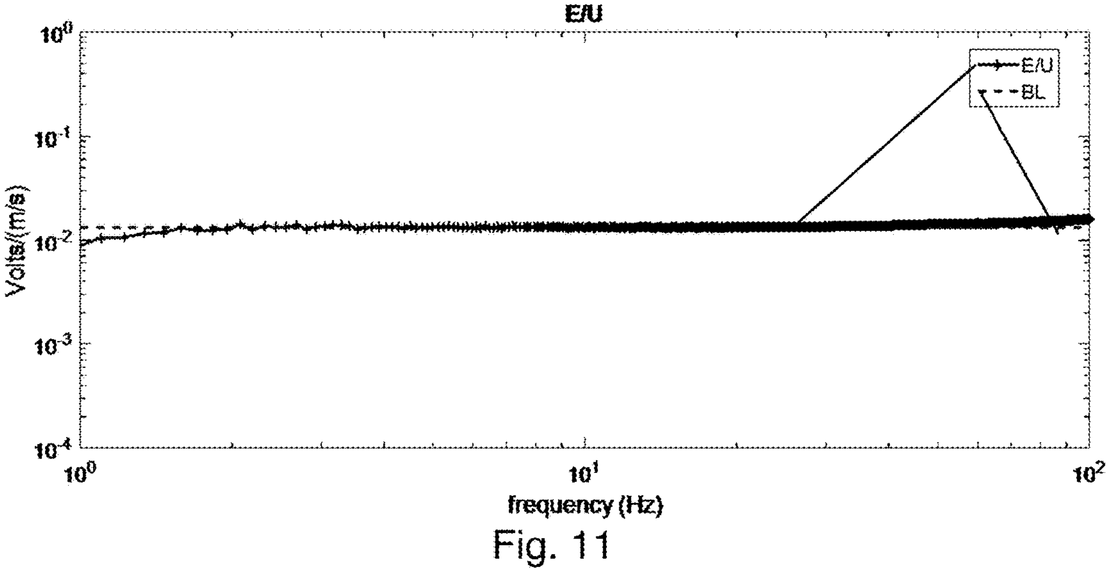
FIG. 11 shows the measured open circuit voltage E over the air motion in the low frequency range 1-100 Hz.
Figure 12:
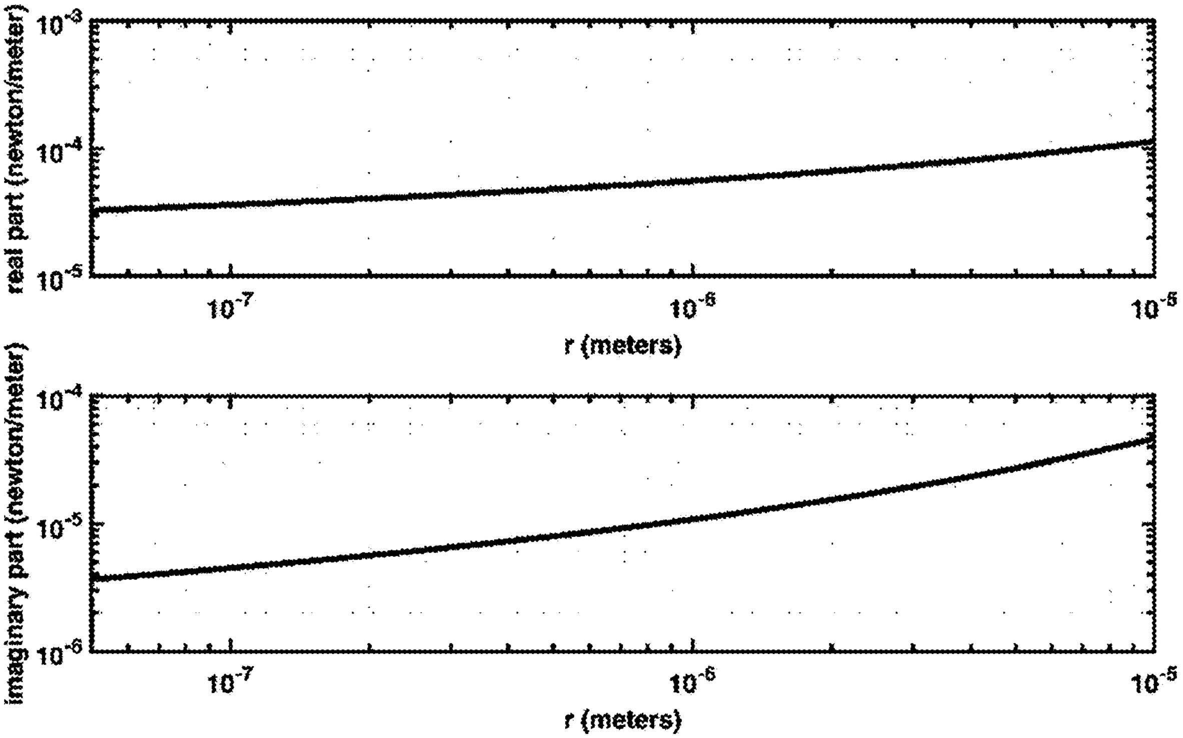
FIG. 12 shows the real and imaginary portions of the viscous force over a range of radii.

FIG. 11 shows results of an experiment seeking to determine low frequency transduction of fiber motion. FIG. 11 shows which shows the open circuit voltage E over the air motion U, is about B×L: E/U=BL=0.35 T×0.038 m.

An extremely convenient method of converting the wire's velocity into a voltage is to employ Faraday's law, in which the open circuit voltage across a conductor is proportional to its velocity relative to a magnetic field. The conductor should, ideally, be oriented orthogonally to the magnetic field lines as should the conductor's velocity vector.

To examine the feasibility of detecting sound, a fine wire was supported on a neodymium magnet, which creates a strong field in the vicinity of the wire. If the magnetic flux density B of the field orthogonal to the wire is assumed to be reasonably constant along the wire length L, Faraday's law may be expressed as $V_o$=BLV (equation (15)).

Each end of the wire was input into a low noise preamplifier while the wire was subjected to a plane sound wave within the anechoic chamber. A Bruel & Kjaer 4138⅛th inch microphone sampled the sound field in the vicinity of the wire. FIG. 9 shows the measured transfer function between the measured output voltage and the incident sound pressure as a function of frequency. The figure also shows the predicted voltage output assuming a BL product of BL≈0.0063 volts-seconds/meter. The predicted voltage output was computed using equation (15) where V is the average wire velocity as a function of position along its length.

Because the overall sensitivity of the microphone (in volts/pascal) will be proportional to the BL product in equation (15), this product is an important parameter, along with selecting a suitably diminutive diameter of the fiber. This product is typically made as large as is feasible. Neodymium magnets are available that can create a flux density of B≈1 Tesla. This leaves the choice of L, the overall length of the fiber.

To estimate the BL product that would be appropriate for the microphone design, it is helpful to cast equation (15) in the form of the predicted overall sensitivity in volts/pascal. To do this, assume that the goal is to detect a plane sound wave in which the relationship between the pressure and acoustic particle velocity is $P/V=\rho_0 c \approx 415$ pascal x sec/meter, where po is the nominal air density and c is the speed of sound wave propagation. The acoustic sensitivity is $V_o/P=BL/\rho_0 c$ volts/pascal. Assume that input-referred noise spectrum level of the amplifier is approximately 10 nV/√Hz (value for current low-noise operational amplifiers), and a goal for the sound input-referred noise floor is 30 dBA (typical value for current high-performance hearing aid microphones); this noise floor corresponds to a pressure spectrum level (actually the square root of the power spectral density) of approximately $10^{-5}$ pascals/√Hz. Knowing the noise floor of the electronic interface of 10 nV/√Hz, and the acoustic noise floor target of $10^{-5}$ pascals/√Hz enables us to estimate the required sensitivity so that sound at the minimum sound level can be detected, $H_{PV}$ is shown by equation (17). Assume that a magnetic flux density of B=1 Tesla can be achieved, then the effective length of conductor that is required can be estimated, $$L \approx 10^{-3}\frac{\rho_0 c}{B} \approx 0.415 \text{ m.} \tag{24}$$

If this length of conductor can be incorporated into a design, the microphone could achieve a noise floor of 30 dBA, based on the assumed electronic noise. Of course, the conductor must be arranged in the form of a coil as in common electrodynamic microphones. A proposed design approach to realize is discussed below.

Figure 5:
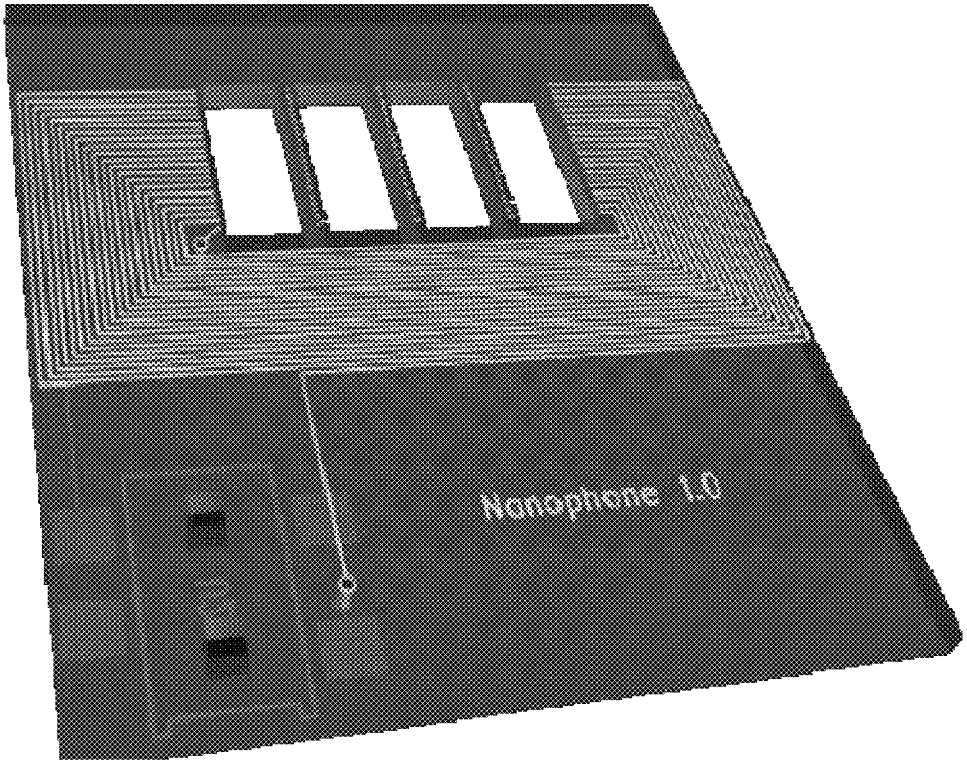
FIG. 5 shows a prototype circuit board for a microphone design.

FIG. 5 shows a prototype circuit board for a microphone design.

Figure 6:
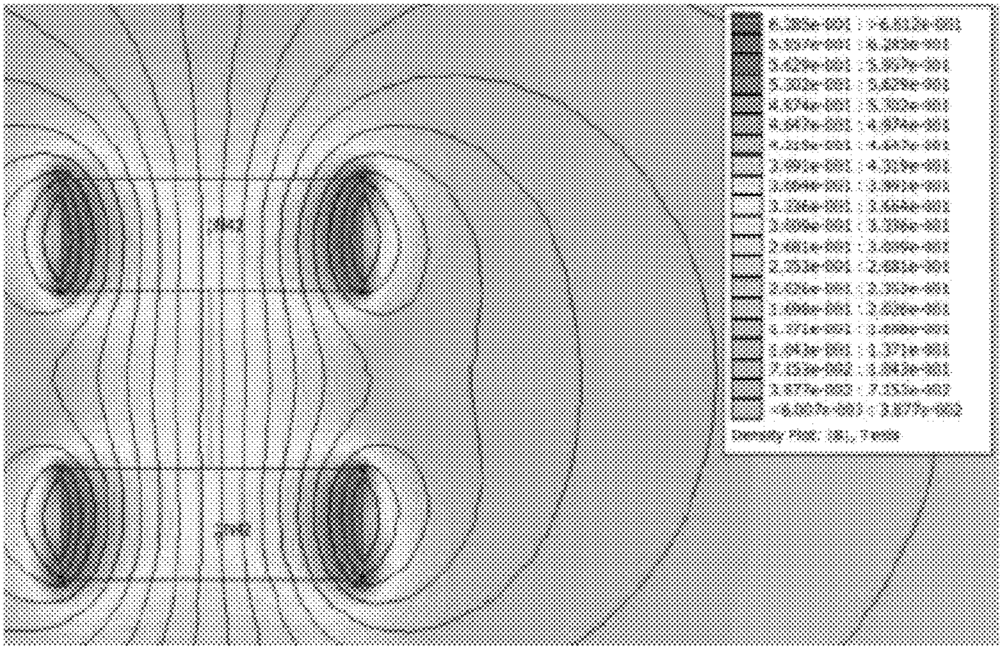
FIG. 6 shows an analysis of the magnetic field surrounding the fibers due to magnets positioned adjacent to the circuit board of FIG. 5.

FIG. 6 shows an analysis of the magnetic field surrounding the fibers due to magnets positioned adjacent to the circuit board of FIG. 5, indicated a value of B≈0.3 Teslas.

According to the design shown in FIG. 5, a set of parallel fibers are suspended in a space which is subject to acoustic wave vibrations. The fibers, though physically in parallel, are wired in series to provide an increased output voltage, and a constrained area or volume of measurement. Each strand may be 1-5 cm long, e.g., 3 cm long, and the total length may be, e.g., >0.4 meters. The entire array is subject to an external magnetic field, which is typically uniform across all fibers, but this is a preference and not a critical constraint. As shown in FIG. 6, the magnetic field is, e.g., 0.3 Teslas. Because the outputs of the various fibers is averaged, various mechanical configurations may be provided to impose known constraints. For example, sets of fibers may be respectively out of phase with respect to a certain type of sound source, and therefore be cancelling (differential). Similarly, directional and phased arrays may be provided. Note that each fiber has a peak response with respect to waves in the surrounding fluid that have a component normal to the axis of the fiber. The fibers may assume any axis, and therefore three dimensional (x, y, z) sensing is supported. It is further noted that the fibers need not be supported under tension, and therefore may be non-linear. Of course, if they are not tensioned, they may not be self-supporting. However, various techniques are available to suspend a thin fiber between two electrodes that is not tensioned alone an axis between the electrodes, without uncontrolled drooping.

For example, a spider web type structure provides an array of thin fibers, which may be planar or three dimensional. Indeed, a spider web or silkworm may be modified to provide sufficient conductivity to be useful as a sensor. A natural spider silk from a large spider is about 2.5-4 μm in diameter, and thus larger than the 600 nm PMMA fiber discussed above. However, small spiders produce a silk less than 1 μm in diameters, e.g., 700 nm, and a baby spider may produce a silk having a diameter of less than 500 nm. Silkworms produce a fiber that is 5-10 μm in diameter.

As shown in FIG. 5, the desired coil configuration may be achieved through circuit-board wiring of electrodes, wherein the fibers are themselves all linear and parallel (at least in groups).

As discussed herein, the conductor length L to be comprised of a number of short segments that are supported on rigid conducting boundaries. The segments will be connected together in series in order to achieve the total desired length L. It is likely infeasible to construct a single strand of nanoscale conductor that is of sufficient length for this application, so assembling the conductor in relatively short segments is much more practical than relying on a single strand in a coil.

By fashioning the conductor length as the series connection of short segments, it is also possible to control the static stiffness of the fiber. Since the purpose is to detect air velocity at audible frequencies, it is beneficial to attenuate the response due to very low frequency air fluctuations. This can be achieved by selecting the length of individual fiber segments to be small enough to set the lowest natural frequency, which may be obtained from equation (9).

It is reasonable to set the lowest natural frequency, $f_l$ to be between 10 Hz and 20 Hz.

Having selected appropriate material properties (such as Young's modulus E and density φ, one may solve equation (9) for the desired length of each segment L with $\omega_i = 2\pi f_l$.

Example 2

In some applications, an infrasonic sensor is desired, with a frequency response $f_l$ that extends to an arbitrarily low frequency, such as a tenth of hundredth of a Hertz. Such a sensor might be useful for detecting fluid flows associated with movement of objects, acoustic impulses, and the like. Such an application works according to the same principles as the sonic sensor applications, though the length of individual runs of fibers might have to be greater.

In addition, the voltage response of the electrode output to movements is proportional to the velocity of the fiber, and therefore one would typically expect that the velocity of movement of fluid particles at infrasonic frequencies would low, leading to low output voltages. However, in some applications, the fluid movement is macroscopic, and therefore velocities may be appreciable. For example, in wake detection applications, the amplitude may be quite robust.

Generally, low frequency sound is detected by sensors which are sensitive to pressure such as infrasound microphones and microbarometers. As pressure is a scaler, multiple sensors should be used to identify the source location. Meanwhile, due to the long wave length of low frequency sound, multiple sensors have to be aligned far away to distinguish the pressure difference so as to identify the source location. As velocity is a vector, sensing sound flow can be beneficial to source localization. There is no available flow sensor that can detect infrasound flow in a broad frequency range with a flat frequency response currently. However, as discussed above, thin fibers can follow the medium (air, water) movement with high velocity transfer ratio (approximate to 1 when the fiber diameter is in the range of nanoscale), from zero Hertz to tens of thousands Hertz. If a fiber is thin enough, it can follow the medium (air, water) movement nearly exactly. This provides an approach to detect low frequency sound flow directly and effectively, with flat frequency response in a broad frequency range. This provides an approach to detect low frequency sound flow directly. The fiber motion due to the medium flow can be transduced by various principles such as electrodynamic sensing of the movement of a conductive fiber within a magnetic field, capacitive sensing, optical sensing and so on. Application example based on electromagnetic transduction is given. It can detect sound flow with flat frequency response in a broad frequency range.

For the infrasound detection, this can be used to detect manmade and natural events such as nuclear explosion, volcanic explosion, severe storm, chemical explosion. For the source localization and identification, the fiber flow sensor can be applied to form a ranging system and noise control to find and identify the low frequency source. For the low frequency flow sensing, this can also be used to detect air flow distribution in buildings and transportations such as airplanes, land vehicles, and seafaring vessels.

The infrasound pressure sensors are sensitive to various environmental parameters such as pressure, temperature, moisture. Limited by the diaphragm of the pressure sensor, there is resonance. The fiber flow sensor avoids the key mentioned disadvantages above. The advantages include, for example: Sensing sound flow has inherent benefit to applications which require direction information, such as source localization. The fiber flow sensor is much cheaper to manufacture than the sound pressure sensor. Mechanically, the fiber can follow the medium movement exactly in a broad frequency range, from infrasound to ultrasound. If the fiber movement is transduced to the electric signal proportionally, for example using electromagnetic transduction, the flow sensor will have a flat frequency response in a broad frequency range. As the flow sensor is not sensitive to the pressure, it has a large dynamic range. As the fiber motion is not sensitive to temperature, the sensor is robust to temperature variation. The fiber flow sensor is not sensitive to moisture. The size of the flow sensor is small (though parallel arrays of fibers may consume volume). The fiber flow sensor can respond to the infrasound instantly.

Note that a flow sensor is, or would be, sensitive to wind. The sensor may also respond to inertial perturbances. For example, the pressure in the space will be responsive to acceleration of the frame. This will cause bulk fluid flows of a compressible fluid (e.g., a gas), resulting in signal output due to motion of the sensor, even without external waves. This can be advantages and disadvantages depends on the detailed applications. For example, it can be used to detect flow distribution in the buildings. If used to detect infrasound, the wind influence be overcome by using an effective wind noise reduction approach.

Example 3

To intuitively illustrate the transverse motion of spider silk due to fluctuating airflow in the direction perpendicular to its long axis, sound is recorded from the silk motion. The complex airborne acoustic signal used here contains low frequency (100 Hz-700 Hz) wing beat of insects and high frequency (2 kHz-10 kHz) song of birds. Spider dragline silk with diameter d=500 nm was collected from a female spiderling *Araneus diadematus* (body length of the spider is about 3 mm). A strand of spider silk (length L=8 mm) is supported at its two ends slackly, and placed perpendicularly to the flow field. The airflow field is prepared by playing sound using loudspeakers. A plane sound wave is generated at the location of the spider silk by placing the loudspeakers far away (3 meters) from the silk in our anechoic chamber. The silk motion is measured using a laser vibrometer (Polytec OFV-534).

While the geometric forms (cob-web, orb-web, and single strand), size and tension of the spider silk shape the ultimate time and frequency responses, this intrinsic aerodynamic property of silk to represent the motion of the medium suggests that it can provide the acoustic information propagated through air to spiders. This may allow them to detect and discriminate potential nearby prey and predators [89, 90], which is different from the well-known substrate-borne information transmission induced by animals making direct contact with the silk [91-94].

Knowing that the spider silk can capture the broadband fluctuating airflow, its frequency and time response is characterized at the middle of a silk strand. Three loudspeakers of different bandwidths were used to generate broadband fluctuating airflow from 1 Hz to 50000 Hz. Note that the amplitude of air particle deflections X at low frequencies are much larger than those at high frequencies for the same air particle velocity V ($X=V/\omega$, where $\omega=2\pi f$, f is the frequency of the fluctuating airflow, and Vis the velocity amplitude). A long (L=3.8 cm) and loose spider silk strand was used to avoid possible nonlinear stretching when the deflection is relatively large at very low frequencies. The nanodimensional spider silk can follow the airflow with maximum physical efficiency ($V_{hair}/V_{air}\approx 1$) in the measured frequency range from 1 Hz to 50 kHz, with a corresponding velocity and displacement amplitude of the flow field of 0.83 mm/s and 13.2 nm, respectively. This shows that the silk motion accurately tracks the air velocity at the initial transient as well as when the motion becomes periodic in the steady-state. The 500 nm spider silk can thus follow the medium flow with high temporal and amplitude resolution.

The motion of a 500 nm silk strand (L=8 mm) is characterized at various locations along its length. Although the fixed ends of the silk cannot move with air, over most of the length, the silk motion closely resembles that of the airflow over a broad frequency range.

If the silk and the surrounding medium to behave as a continuum, a model for the silk motion can be expressed in the form of a simple partial differential equation. This simple approximate analytical model is presented in Equation (25) to examine the dominant forces and response of a thin fiber in the sound field.

$$EI\frac{\partial^4 w(x,t)}{\partial x^4} + \rho A\frac{\partial^2 w(x,t)}{\partial t^2} = Cv_r(t) + M\frac{dv_r(t)}{dt} \qquad (25)$$

The left term gives the mechanical force due to bending of the fiber per unit length, where E is Young's Modulus of elasticity, $I=\pi d^4/64$ is the area moment of inertia, w(x,t) is the fiber transverse displacement, which depends on both position, x, and time, t. The second term on the left accounts for the inertia of the fiber where ρ is volume density, and $A=\pi d^2/4$ is the cross section area. The right term estimates the viscous force due to the relative motion of the fiber and the surrounding fluid. C and M are damping and added mass per unit length which, for a continuum fluid, were determined by Stokes (50). $v_r(t)=v_{air}(t)-v_{silk}(t)$ is the relative velocity between the air movement and fiber motion.

It should be noted that the first term on the left side of Equation (25) accounts for the fact that thin fibers will surely bend as they are acted on by a flowing medium. This differs from previous studies of the flow-induced motion of thin hairs which assume that the hair moves as a rigid rod supported by a torsional spring at the base [1, 2, 82, 84, 85]. The motion of a rigid hair can be described by a single coordinate such as the angle of rotation about the pivot. In our case, the deflection depends on a continuous variable, x, describing the location along the length. Equation (25) is then a partial differential equation unlike the ordinary differential equation used when the hair does not bend or flex.

It is evident that the terms on the left side of Equation (25) are proportional to either $d^4$ or $d^2$. The dependence on the diameter d of the terms on the right side of this equation is more difficult to calculate owing to the complex mechanics of fluid forces. It can be shown, however, that these fluid forces tend to depend on the surface area of the fiber, which is proportional to its circumference πd. As d becomes sufficiently small, the terms proportional to C and M will clearly dominate over those on the left side of Equation (25). For sufficiently small values of the diameter d, the governing equation of motion of the fiber becomes approximately:

$$0 \approx Cv_r(t) + M\frac{dV_r(t)}{dt} \tag{26}$$

For small values of d, Equation (25) is then dominated by terms that are proportional to $v_r(t)$, the relative motion between the solid fiber and the medium. Since $v_r(t)=v_{air}(t)-v_{silk}(t)$, the solution of Equation (26) may be approximated by $v_{air}(t)\approx v_{silk}(t)$. According to this highly simplified continuum view of the medium, the fiber will thus move with the medium fluid instantaneously and with the same amplitude if the fiber is sufficiently thin.

To examine the validity of the approximate analysis above, the velocity response of dragline silks (L=3.8 cm) from female orb-weaver spiders *Araneus diadematus* having various diameters: 0.5 μm, 1.6 μm, 3 μM were measured at the middle position. Predictions are obtained by solving Equation (25).

Figure 13:
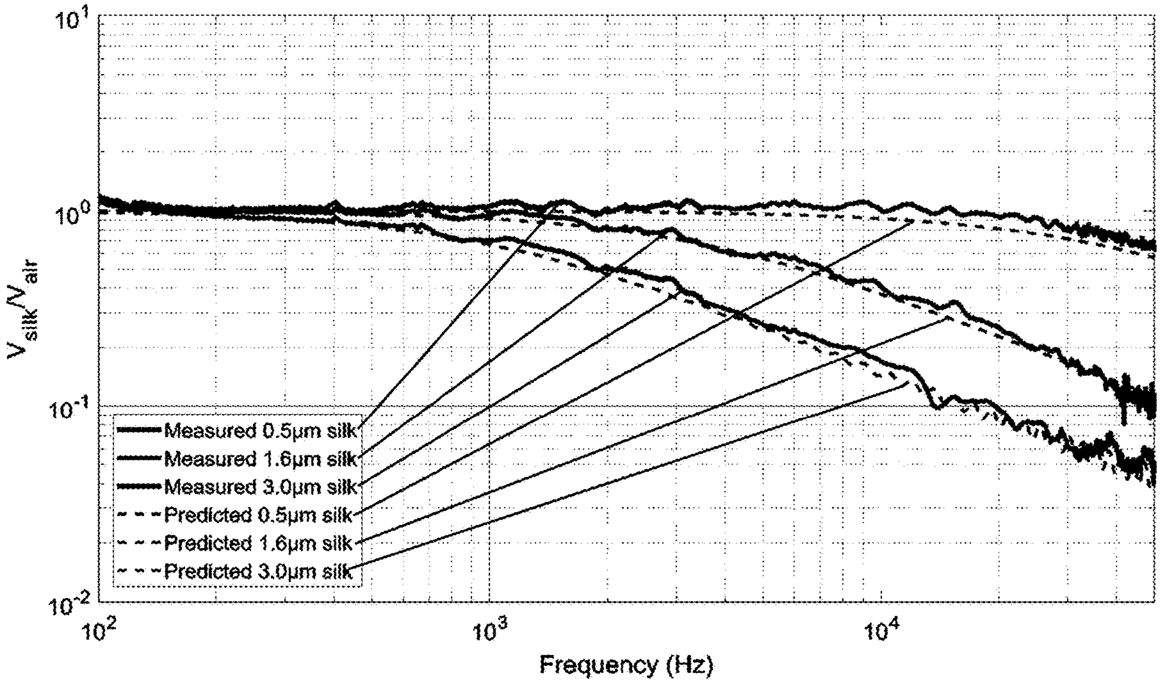
FIG. 13 shows Predicted and measured silk velocity relative to the air particle velocity for silks (L=3.8 cm) of various diameters: 500 nm, 1.6 μm, 3 μm.

FIG. 13 shows predicted and measured velocity transfer functions of silks using the air particle velocity as the reference. Predictions are obtained by solving Equation (26). In the prediction model, Young's modulus E and volume density ρ are 10 Gpa [96] and 1,300 kg/$m^3$ [97], respectively. The measured responses of the silks are in close agreement with the predicted results. While all three of the measured silks can follow the air motion in a broad frequency range, the thinnest silk can follow air motion closely ($V_{silk}/V_{air}$~1) at extremely high frequencies up to 50 kHz. These results suggest that when a fiber is sufficiently thin (diameter in nanodimensional scale), the fiber motion can be dominated by forces associated with the surrounding medium, causing the fiber to represent the air particle motion accurately. Over a wide range of frequencies, the fiber motion becomes independent of its material and geometric properties when it is sufficiently thin.

The fiber motion can be transduced to an electric signal using various methods depending on various application purposes. Because the fiber curvature is substantial near each fixed end, sensing bending strain can be a promising approach. If nanowires are stacked into a rigid 3-dimension nanolattice [97], capacitive transduction is also possible. When sensing steady or slowly changing flows for applications such as controlled microfluidics, the transduction of fiber displacement may be preferred over velocity. Having an electric output that is proportional to the velocity of the silk is advantageous when detecting broadband flow fluctuations such as sound. While the detailed transduction approach (for example piezoresistive, piezoelectric, capacitive, magnetic, and optical sensing) may be different depending on the applications, the fact that the fiber motion is nearly identical to that of the medium in its vicinity will always prove beneficial. Advances in nanotechnology make the flow sensor fabrication possible [97-99].

In an electromagnetic induction embodiment, the motion of the fiber is transduced to an open circuit voltage output E directly based on Faraday's Law, $E=BLV_{fiber}$, where B is the magnetic flux density, and L is the fiber length. To examine the feasibility of this approach, a 3.8 cm long loose spider silk with a 500-nm diameter is coated with an 80 nm thick gold layer using electron beam evaporation to obtain a free-standing conductive nanofiber. The conductive fiber is aligned in a magnetic field with flux density B=0.35 T. The orientation of the fiber axis, the motion of the fiber, and the magnetic flux density, are all approximately orthogonal. Because the fiber accurately follows the airflow ($V_{fiber}/V_{air}\approx 1$) over most of the length, and the fiber motion is transduced linearly to a voltage signal, $E/V_{air}$ is approximately equal to the product of B and L in the measured frequency range 1 Hz-10 kHz. The open circuit voltage across the silk is detected using a low-noise preamplifier SRS Model SR560.

This provides a directional, passive and miniaturized approach to detect broadband fluctuating airflow with excellent fidelity and high resolution. This device and technology may be incorporated in a system for passive sound source localization, even for infrasound monitoring and localization despite its small size. The sensor is sensitive to the flow direction with relationship $e(t)=e_0(t)\cos(\theta)$, where $e_0(t)$ is the voltage output when the flow is perpendicular to the fiber direction (θ=0°). As infrasound waves have large wavelength λ (λ=c/f, c is speed of sound), at least two pressure sensors should normally be used and placed at large separation distances (on the order of m to km) in order to determine the wave direction. Since velocity is a vector, in contrast to the scalar pressure, flow sensing inherently contains the directional information. This is very beneficial if one wishes to localize a source. The device can also work as a nanogenerator to harvest broadband flow energy with high power density [100]. For a conductive fiber (of length L, cross section area A, volume V=LA, resistivity $\rho_e$, velocity amplitude V), the maximum generated voltage $E_0=BLV$, the fiber resistance $R=\rho_e L/A$, the maximum short circuit power per unit volume can be expressed as $P/V=B^2V^2/\rho_e$. If B=1 T, V=1 cm/s, $\rho_e=2.44\times10^{-8}\,\Omega\cdot m$, then P/V is 4.1 mW/$cm^3$.

The results presented here offer a simple, low-cost alternative to methods for measuring fluctuating flows that require seeding the fluid with flow tracer particles such as laser Doppler velocimetry (LDV) or particle image velocimetry (PIV). While good fidelity can be obtained by careful choice of tracer particles [101], these methods employ rather complicated optical systems to track the tracer particle motions. However, according to the present technology, a velocity-dependent voltage is obtained using simple electrodynamic transduction by measuring the open-circuit voltage between the two ends of the fiber when it is in the presence of a magnetic field.

The motion of a fiber having a diameter at the nanodimensional scale can closely resemble that of the flow of the surrounding air, providing an accurate and simple approach to detect complicated airflow. This is a result of the dominance of applied forces from the surrounding medium over internal forces of the fiber such as those associated with bending and inertia at these small diameters. This study was inspired by numerous examples of acoustic flow sensing by animals [1, 2, 82, 83]. The results indicate that this biomimetic device responds to subtle air motion over a broader range of frequencies than has been observed in natural flow sensors. The miniature fiber-based approach of flow sensing has potential applications in various disciplines which have been pursuing precise flow measurement and control in various mediums (air, gas, liquid) and situations (from steady flow to highly fluctuating flow).

All measurements were performed in the anechoic chamber at Binghamton University. The fluctuating airflow was created using loudspeakers. In order to obtain measurements over the broad frequency range examined, three different experimental setups were employed, each designed to cover a portion of the frequency range. The fluctuating airflow from 100 Hz to 50 kHz near the silk is determined using a measure of the spatial gradient of the pressure, $\partial p(x,t)/\partial x$ [102]. Knowing the sound pressure gradient, the acoustic particle velocity, $v_a(x,t)$, is calculated using Euler's equation: $-\partial p(x,t)/\partial x=\rho_0 \partial v_a(x,t)/\partial t$, where $\rho_0$ is the air density. The pressure is measured using a calibrated reference microphone.

Figure 14:
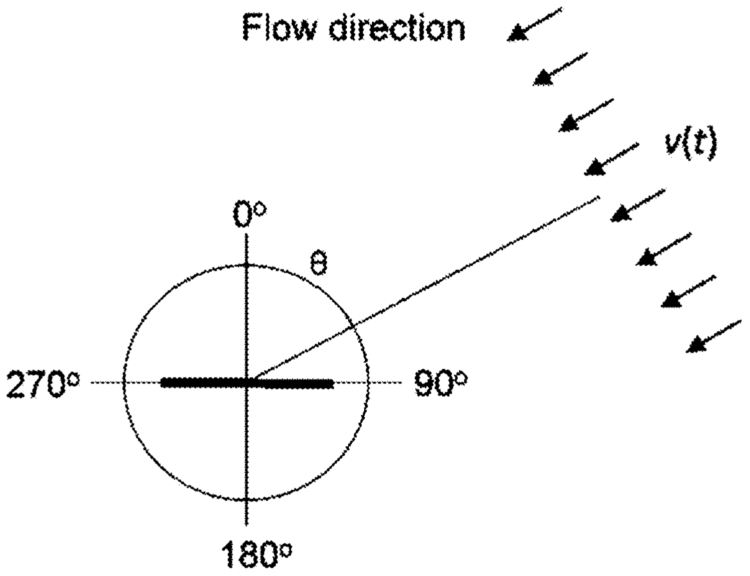
FIG. 14 shows a relative direction of flow of the fluid medium with respect to the fiber.

In the prototype typical transducer configuration, the orientation of the fiber axis, and the magnetic flux density, are orthogonal. Suppose θ is the angle between the flow direction and the fiber direction, as shown FIG. 14, the sensor has the maximum response $e_0(t)$, when the flow direction is perpendicular to the fiber direction, $e_0(t)=BLv(t)$.

Figure 15:
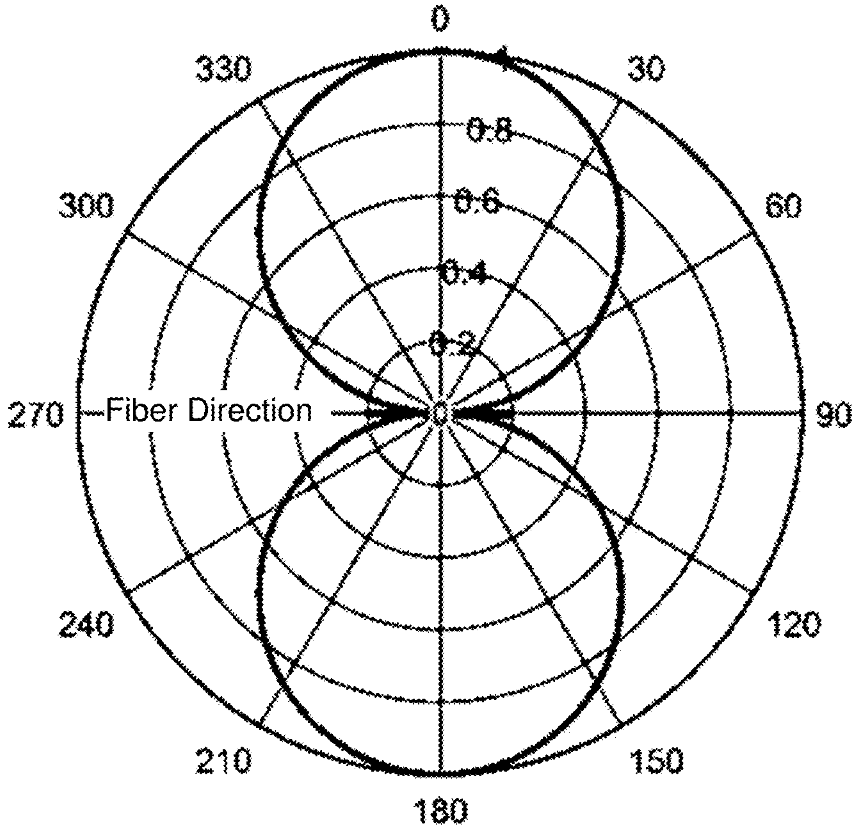
FIG. 15 shows a predicted directional response of the fiber to waves in the fluid medium, independent of frequency.

The sensor is sensitive to the flow direction with relationship, $e_0(t)=e_0(t)\cos(0)$. A single sensor is expected to have a bi-directional (figure-of-eight) directivity. The directional response is independent of frequency. The predicted directional response is shown in FIG. 15.

Figure 16A:
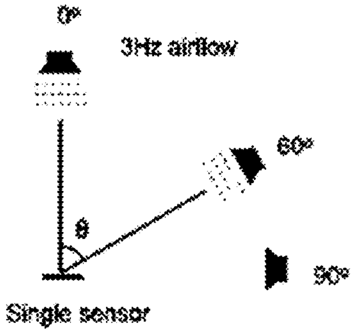
FIGS. 16A and 16B show test configuration, and a directional response of a fiber to a 3 Hz infrasound wave in air.
Figure 16B:
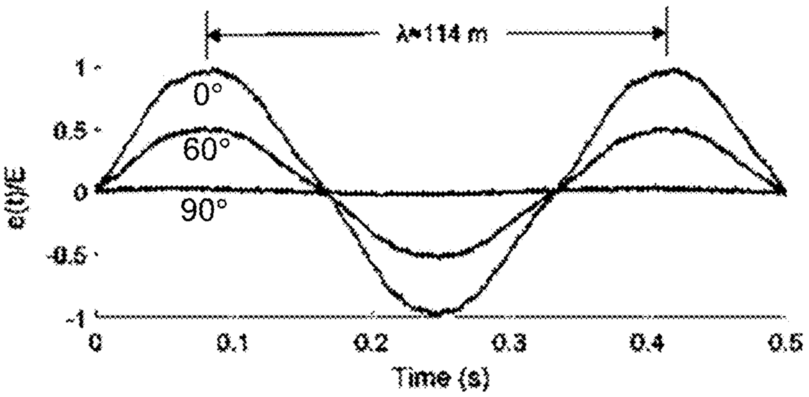

This suggests it could be incorporated in a system for passive flow source localization, even for infrasound monitoring and localization despite its small size. FIG. 16A shows a schematic test setup, and FIG. 16B shows the directional sensor response to a 3 Hz infrasound flow with wavelength about 114 m. As infrasound waves have large wavelength λ, λ=c/f, at least two pressure sensors should normally be used and placed at large separation distances (on the order of m to km) in order to determine the wave direction. Since velocity is a vector, in contrast to the scalar pressure, flow sensing inherently contains the directional information. This is very beneficial if one wishes to localize a source.

Figure 17:
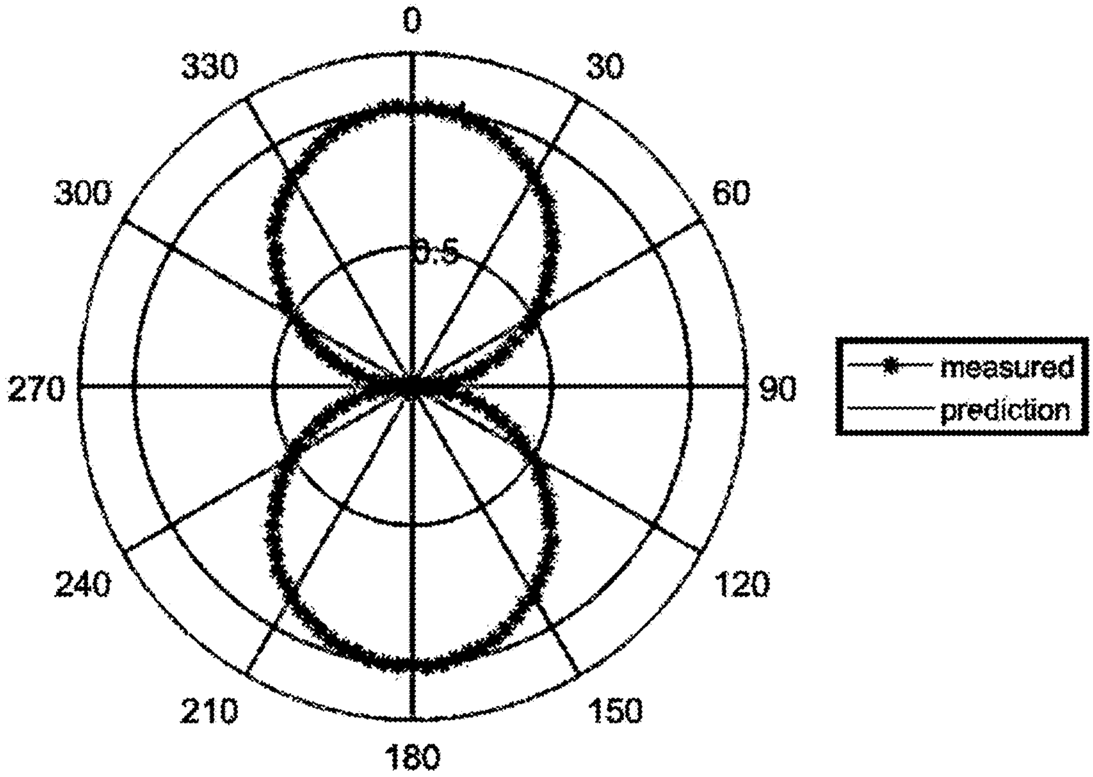
FIG. 17 shows a measured and predicted directivity of a single fiber as a sensor to 500 Hz vibrations.

The measured directivity of a single sensor at 500 Hz audible sound is shown in FIG. 17. The measured directivity matches well with the predicted directivity.

The sound pressure near the silk is measured using the calibrated probe microphone (B&K type 4182). The measured microphone signal is amplified by a B&K type 5935L amplifier and then filtered using a high-pass filter at 30 Hz. To measure the frequency response of the spider silk in the frequency range of 1-100 Hz, a maximum length sequence signal having frequency components over the range of 0-50,000 Hz was employed. The signal sent to the subwoofer (Tang Band W6-113951F) was filtered using a low-pass filter (Frequency Devices 9002) at 100 Hz, and amplified using a Techron 5530 power supply amplifier. To measure the silk frequency response in the range of 100 Hz-3 kHz, the signal sent to the subwoofer (Coustic HT612) was filtered using a low-pass filter (Frequency Devices 9002) at 3 kHz, and amplify it using a Techron 5530 power supply amplifier. To measure the silk frequency response at 3-50 kHz, the signal sent to the supertweeter was filtered using a high-pass filter (KrohnHite model 3550) at 3 kHz, and amplified it using a Crown D-75 amplifier. The standard reference sound pressure for the calculation of the sound pressure level is 20 μPa. For the measurement of the open-circuit voltage E of the conductive fiber, the signal is amplified by a low-noise preamplifier, SRS model SR560. All of the data are acquired by an NI PXI-1033 data acquisition system.

Figure 18:
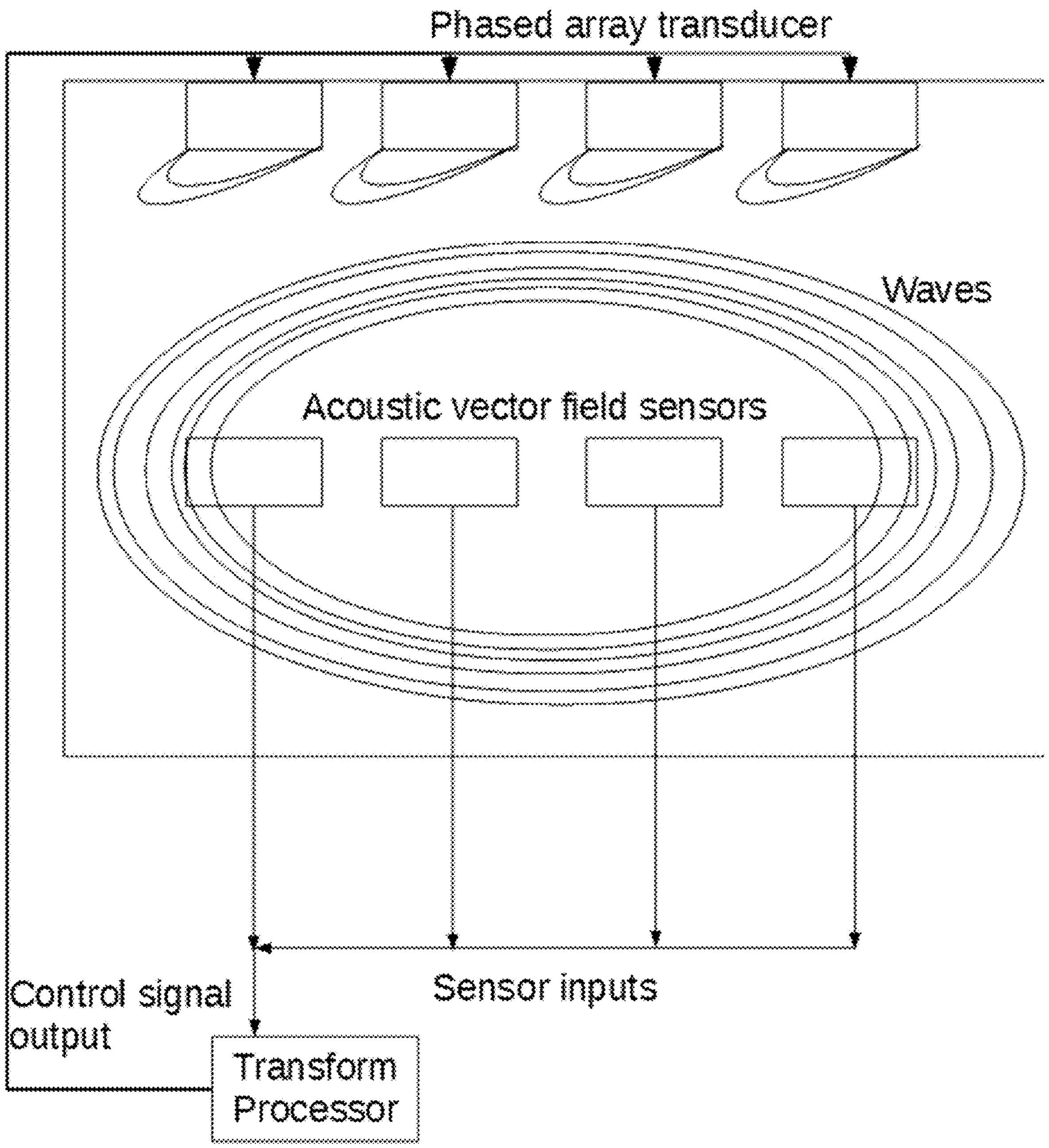
FIG. 18 shows a metamaterial system having a plurality of acoustic vector field sensors and a phased array transducer.

FIG. 18 shows a metamaterial system having a plurality of acoustic vector field sensors, each configured to sense an acoustic vector field of a fluid within a fluid-filled space in response to fluid waves, and producing an electrical signal corresponding to the sensed acoustic vector field. A processor is provided, configured to perform a time and space transform on the electrical signal and to produce a corresponding output. The output communicates a control signal for at least one phased array transducer, which is defined to cause the at least one phased array transducer to emit fluid waves according to a defined acoustic vector field pattern, dependent on a result of the time and space transform, within a portion of the fluid.

FIG. 19 shows a flowchart of a metamaterial method, comprising: providing a plurality of acoustic vector field sensors, each configured to sense an acoustic vector field of a fluid within a fluid-filled space in response to fluid waves, and producing an electrical signal corresponding to the sensed acoustic vector field; receiving the electrical signal responsive to the acoustic vector field of the fluid within the fluid-filled space by the plurality of acoustic vector field sensors; performing a time and space transform on the electrical signal with an automated transform processor, e.g., a metamaterial transfer function having a negative index; and generating an output, which communicates a control signal for at least one phased array transducer, the control signal being defined to cause the at least one phased array transducer to emit fluid waves having an acoustic vector field pattern dependent on at least a result of the time and space transform within a portion of the fluid.

Figure 20:
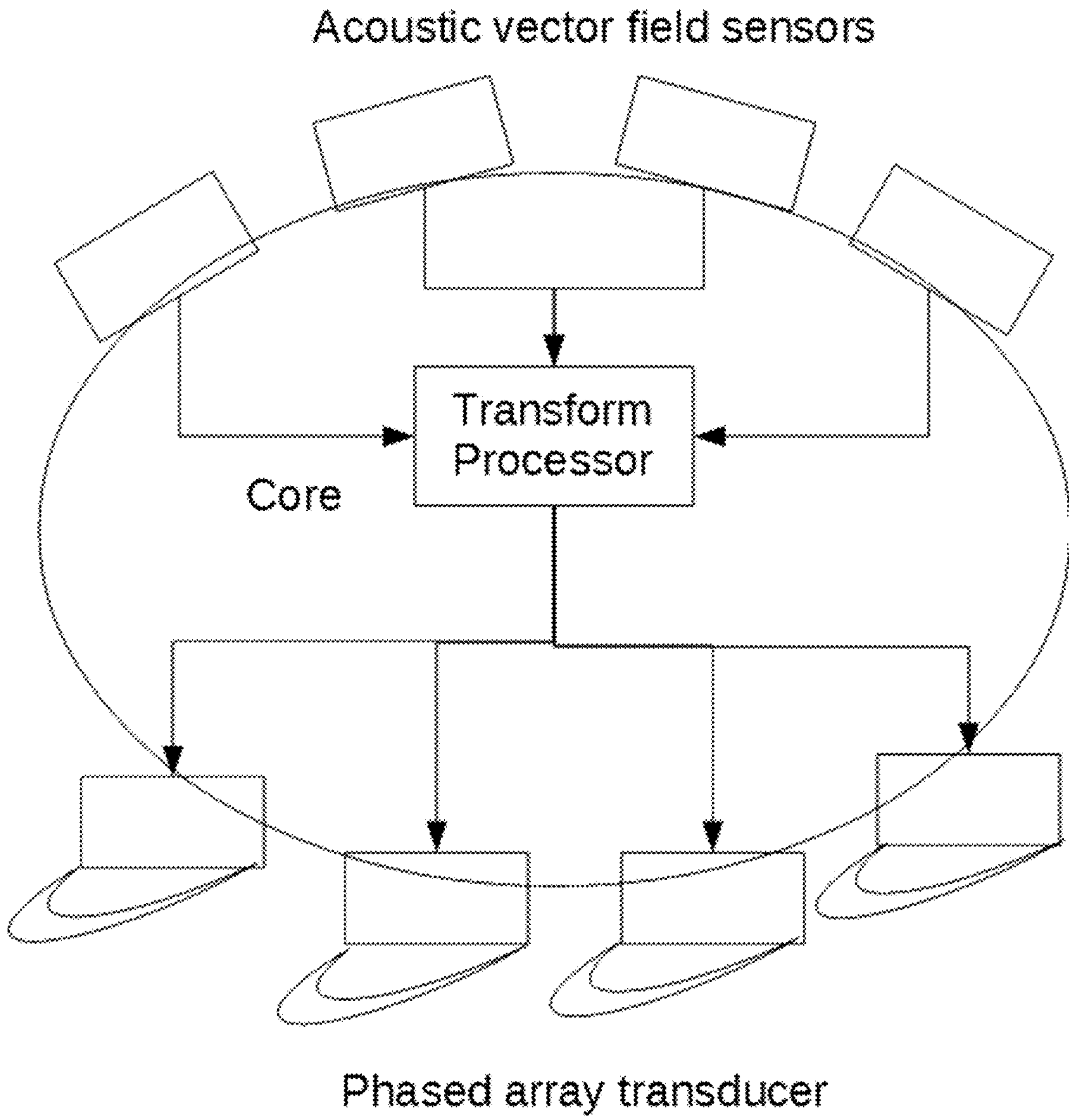
FIG. 20 shows a sensor array and phased transducer array formed around a core.

FIG. 20 shows system having a plurality of acoustic vector field sensors surrounding a core which interferes with fluid wave propagation in the fluid surrounding the core. A plurality of acoustic vector field sensors are arranged in an array around the core, to sense at least an axis of propagation of the fluid wave. At least a portion of the at least one phased array transducer is disposed on at least an opposite side of the core from at least a portion of the plurality of acoustic vector field sensors. The at least one phased array transducer is driven to at least compensate for an interaction of the core with respect to the fluid waves.

REFERENCES

Each of the following is expressly incorporated herein by reference in its entirety as if expressly set forth herein:

[1] F. G. Barth. Spider senses-technical perfection and biology. Zoology, 105(4):271-285, 2002.

[2] B. Bathellier, T. Steinmann, F. G. Barth, and J. Casas. Air motion sensing hairs of arthropods detect high frequencies at near-maximal mechanical efficiency. Journal of The Royal Society Interface, 9(71), pp. 1131-1143, page rsif20110690, 2011.

[3] B. Bicen, S. Jolly, K. Jeelani, C. T. Garcia, N. A. Hall, F. L. Degertekin, Q. Su, W. Cui, and R. N. Miles. Integrated Optical Displacement Detection and Electrostatic Actuation for Directional Optical Microphones With Micromachined Biomimetic Diaphragms. IEEE Sensors Journal, 9(12):1933-1941, December 2009.

[4] T. T. Bringley. Analysis of the immersed boundary method for Stokes flow. PhD thesis, New York University, 2008.

[5] W. Cui, B. Bicen, N. Hall, S. Jones, F. Degertekin, and R. Miles. Optical sensing in a directional MEMS microphone inspired by the ears of the parasitoid fly, *Ormia ochracea*. In MEMS 2006: 19th IEEE International Conference on Micro Electro Mechanical Systems, Technical Digest, Proceedings: IEEE Micro Electro Mechanical Systems Workshop, pages 614-617, 2006. 19th IEEE International Conference on Micro Electro Mechanical Systems (MEMS 2006), Istanbul, Turkey, Jan. 22-26, 2006.

[6] J. L. Desjardins. The effects of hearing aid directional microphone and noise reduction processing on listening effort in older adults with hearing loss. Journal of the American Academy of Audiology, 27(1):29-41, 2016.

[7] H. Droogendijk, J. Casas, T. Steinmann, and G. Krijnen. Performance assessment of bio-inspired systems: flow sensing mems hairs. Bioinspiration & biomimetics, 10(1): 016001, 2014.

[8] J. Gao, R. N. Miles, and W. Cui. Stress analysis of a novel MEMS microphone chip using finite element analysis. In Electronic and Photonic Packaging, Integration and Packaging of Micro/Nano/Electronic Systems, pages 259-267, 2005. ASME International Mechanical Engineering Congress and Exposition, Orlando, FL, Nov. 5-11, 2005.

[9] M. C. Gopfert and D. Robert. Nanometre—range acoustic sensitivity in male and female mosquitoes. Proceedings of the Royal Society of London B: Biological Sciences, 267(1442):453-457, 2000.

[10] M. C. Gopfert and D. Robert. Active auditory mechanics in mosquitoes. Proceedings of the Royal Society of London B: Biological Sciences, 268(1465):333-339, 2001.

[11] T. Gotz. Interactions of fibers and flow: asymptotics, theory and numerics. PhD thesis, Technical University of Kaiserslautern, 2000.

[12] D. Homentcovschi, W. Cui, and R. N. Miles. Modelling of viscous squeeze-film damping and the edge correction for perforated microstructures having a special pattern of holes. In ASME 2007 International Design Engineering Technical Conferences and Computers and Information in Engineering Conference, pages 1025-1033. American Society of Mechanical Engineers, 2007.

[13] D. Homentcovschi and R. Miles. Viscous damping of perforated planar micromechanical structures. Sensors and Actuators A: Physical, 119(2):544-552, 2005.

[14] D. Homentcovschi, R. Miles, P. Loeppert, and A. Zuckerwar. A microacoustic analysis including viscosity and thermal conductivity to model the effect of the protective cap on the acoustic response of a mems microphone. Microsystem technologies, 20(2):265-272, 2014.

[15] D. Homentcovschi and R. N. Miles. Modeling of viscous damping of perforated planar microstructures. applications in acoustics. The Journal of the Acoustical Society of America, 116(5):2939-2947, 2004.

[16] D. Homentcovschi and R. N. Miles. Viscous scattering of a pressure wave: calculation of the fluid tractions on a biomimetic acoustic velocity sensor. The Journal of the Acoustical Society of America, 119(2):777-787, 2006.

[17] D. Homentcovschi and R. N. Miles. A boundary integral approach to analyze the viscous scattering of a pressure wave by a rigid body. Engineering analysis with boundary elements, 31(10):844-855, 2007.

[18] D. Homentcovschi and R. N. Miles. Viscous microstructural dampers with aligned holes: Design procedure including the edge correction. The Journal of the Acoustical Society of America, 122(3):1556-1567, 2007.

[19] D. Homentcovschi and R. N. Miles. Analytical model for viscous damping and the spring force for perforated planar microstructures acting at both audible and ultrasonic frequencies. The Journal of the Acoustical Society of America, 124(1):175-181, 2008.

[20] D. Homentcovschi and R. N. Miles. Influence of viscosity on the reflection and transmission of an acoustic wave by a periodic array of screens: The general 3-d problem. Wave Motion, 45(3):191-206, 2008.

[21] D. Homentcovschi and R. N. Miles. Viscous damping and spring force in periodic perforated planar microstructures when the reynolds equation cannot be applied. The Journal of the Acoustical Society of America, 127(3): 1288-1299, 2010.

[22] D. Homentcovschi and R. N. Miles. An analytical-numerical method for determining the mechanical response of a condenser microphone. The Journal of the Acoustical Society of America, 130(6):3698-3705, 2011.

[23] D. Homentcovschi, R. N. Miles, and L. Tan. Influence of viscosity on the diffraction of sound by a periodic array of screens. The Journal of the Acoustical Society of America, 117(5):2761-2771, 2005.

[24] D. Homentcovschi, B. T. Murray, and R. N. Miles. An analytical formula and fem simulations for the viscous damping of a periodic perforated mems microstructure outside the lubrication approximation. Microfluidics and nanofluidics, 9(4-5):865-879, 2010.

[25] D. Homentcovschi, B. T. Murray, and R. N. Miles. Viscous damping and spring force calculation of regularly perforated mems microstructures in the stokes approximation. Sensors and Actuators A: Physical, 201:281-288, 2013.

[26] W.-X. Huang, S. J. Shin, and H. J. Sung. Simulation of flexible filaments in a uniform flow by the immersed boundary method. Journal of Computational Physics, 226(2):2206-2228, 2007.

[27] J. A. Humphrey, R. Devarakonda, I. Iglesias, and F. G. Barth. Dynamics of arthropod filiform hairs. i. mathematical modelling of the hair and air motions. Philosophical Transactions of the Royal Society of London B: Biological Sciences, 340(1294):423-444, 1993.

[28] C. Johnston. Original communications: Auditory apparatus of the *Culex mosquito*. Journal of Cell Science, 1(10):97-102, 1855.

[29] W. Julius and H. F. Olson. Sound pick-up device, Dec. 27, 1932. U.S. Pat. No. 1,892,645.

[30] G. Keidser, H. Dillon, E. Convery, and J. Mejia. Factors influencing individual variation in perceptual directional microphone benefit. Journal of the American Academy of Audiology, 24(10):955-968, 2013.

[31] M. C. Killion. Myths about hearing in noise and directional microphones. Hearing Review, 11(2):14-21, 2004.

[32] I. Merks, B. Xu, and T. Zhang. Design of a high order binaural microphone array for hearing aids using a rigid spherical model. In Acoustics, Speech and Signal Processing (ICASSP), 2014 IEEE International Conference on, pages 3650-3654. IEEE, 2014.

[33] R. Miles. High-order directional microphone diaphragm, Nov. 8, 2005. U.S. Pat. No. 6,963,653.

[34] R. Miles. Comb sense capacitive microphone, Jun. 9, 2009. US Patent App. 20,090/262,958.

[35] R. Miles and F. Degertekin. Optical sensing in a directional mems microphone, Nov. 2, 2010. U.S. Pat. No. 7,826,629.

[36] R. Miles and R. Hoy. The development of a biologically-inspired directional microphone for hearing aids. Audiology and Neuro-Otology, 11(2):86-94, 2006.

[37] R. Miles, D. Robert, and R. Hoy. Mechanically coupled ears for directional hearing in the parasitoid fly *Ormia ochracea*. The Journal of the Acoustical Society of America, 98(6):3059-3070, 1995.

[38] R. Miles, S. Sundermurthy, C. Gibbons, R. Hoy, and D. Robert. Differential microphone, Sep. 7, 2004. U.S. Pat. No. 6,788,796.

[39] R. Miles, T. Tieu, D. Robert, and R. Hoy. A mechanical analysis of the novel ear of the parasitoid fly *Ormia ochracea*. Proceedings: Diversity in Auditory Mechanics, pages 18-24, 1997.

[40] R. N. Miles, W. Cui, Q. T. Su, and D. Homentcovschi. A mems low-noise sound pressure gradient microphone with capacitive sensing. Journal of Microelectromechanical Systems, 24(1):241-248, 2015.

[41] R. N. Miles, Q. Su, W. Cui, M. Shetye, F. L. Degertekin, B. Bicen, C. Garcia, S. Jones, and N. Hall. A low-noise differential microphone inspired by the ears of the parasitoid fly *Ormia ochracea*. Journal of the Acoustical Society of America, 125(4, Part 1):2013-2026, April 2009.

[42] R. N. Miles and J. Zhou. Sound-induced motion of a nanoscale fiber. Journal of Vibration and Acoustics 140.1 (2018): 011009.

[43] B. Nadrowski, T. Effertz, P. R. Senthilan, and M. C. Gopfert. Antennal hearing in insects—new findings, new questions. Hearing research, 273(1):7-13, 2011.

[44] H. F. Olson. Acoustical device, Dec. 21, 1937. U.S. Pat. No. 2,102,736.

[45] H. F. Olson. Elements of Acoustical Engineering. D. Van Nostrand Company, 1947.

[46] D. Robert, R. Miles, and R. Hoy. Directional hearing by mechanical coupling in the parasitoid fly *Ormia ochracea*. Journal of Comparative Physiology A: Neuroethology, Sensory, Neural, and Behavioral Physiology, 179(1): 29-44, 1996.

[47] D. Robert, R. Miles, and R. Hoy. Tympanal mechanics in the parasitoid fly *Ormia ochracea*: intertympanal coupling during mechanical vibration. Journal of Comparative Physiology A: Neuroethology, Sensory, Neural, and Behavioral Physiology, 183(4):443-452, 1998.

[48] M. J. Shelley and T. Ueda. The stokesian hydrodynamics of flexing, stretching filaments. Physica D: Nonlinear Phenomena, 146(1):221-245, 2000.

[49] D. Srivastava. Slender body theory for stokes flow past axisymmetric bodies: a review article. International Journal of Applied Mathematics and Mechanics, 8(15):14-39, 2012.

[50] G. G. Stokes. On the effect of the internal friction of fluids on the motion of pendulums, volume 9. Pitt Press, 1851.

[51] L. Tan, R. Miles, M. Weinstein, R. Miller, Q. Su, W. Cui, and J. Gao. Response of a biologically inspired NMMS differential microphone diaphragm. In Carapezza, E M, editor, Unattended Ground Sensor Technologies and Applications IV, volume 4743 of Proceedings of the Society of Photo-Optical Instrumentation Engineers (SPIE), pages 91-98, 2002. Conference on Unattended Ground Sensor Technologies and Applications IV, Orlando, FL, Apr. 2-5, 2002.

[52] J. Tao and X. B. Yu. Hair flow sensors: from bio-inspiration to bio-mimicking a review. Smart Materials and Structures, 21(11):113001, 2012.

[53] A.-K. Tornberg and K. Gustaysson. A numerical method for simulations of rigid fiber suspensions. Journal of Computational Physics, 215(1):172-196, 2006.

[54] A.-K. Tornberg and M. J. Shelley. Simulating the dynamics and interactions of flexible fibers in stokes flows. Journal of Computational Physics, 196(1):8-40, 2004.

[55] S. Towfighian and R. N. Miles. A new approach to capacitive sensing: Repulsive sensors, Sep. 1, 2016. NSF Grant 1608692.

[56] N. Wu, R. Miles, and O. Aydin. A digital feedback damping scheme for a micromachined directional microphone. In Proceedings of the 2004 American Control Conference, v. 1-6, Proceedings of the American Control Conference, pages 3315-3320, 2004. American Control Conference, Boston, MA, Jun. 30-Jul. 2, 2004.

[57] Y.-H. Wu. Effect of age on directional microphone hearing aid benefit and preference. Journal of the American Academy of Audiology, 21(2):78-89, 2010.

[58] Y.-H. Wu and R. A. Bentler. Impact of visual cues on directional benefit and preference: Part i laboratory tests. Ear and hearing, 31(1):22-34, 2010.

[59] Y.-H. Wu and R. A. Bentler. Impact of visual cues on directional benefit and preference: Part ii field tests. Ear and hearing, 31(1):35-46, 2010.

[60] Y.-H. Wu, E. Stangl, and R. A. Bentler. Hearing-aid users voices: A factor that could affect directional benefit. International journal of audiology, 52(11):789-794, 2013.

[61] K. Yoo, C. Gibbons, Q. Su, R. Miles, and N. Tien. Fabrication of biomimetic 3-D structured diaphragms. Sensors and Actuators A—Physical, 97-8:448-456, Apr. 1, 2002. Transducers 2001 Conference/Eurosensor XVth Conference, Munich, Germany, Jun. 10-14, 2001.

[62] J. Zhou, R. N. Miles, and S. Towfighian. A novel capacitive sensing principle for microdevices. In ASME 2015 International Design Engineering Technical Conferences and Computers and Information in Engineering Conference, pages V004T09A024-V004T09A024. American Society of Mechanical Engineers, 2015.

[63] Cox, R. G., 1970, "The Motion of Long Slender Bodies in a Viscous Fluid Part 1. General Theory," J. Fluid Mech., 44(4), pp. 791-810.

[64] Rosenhead, L., 1963, Laminar Boundary Layers: An Account of the Development, Structure, and Stability of Laminar Boundary Layers in Incompressible Fluids, Together With a Description of the Associated Experimental Techniques, Clarendon Press, London.

[65] Shamble, P. S., Menda, G., Golden, J. R., Nitzany, E. I., Walden, K., Beatus, T., Elias, D. O., Cohen, I., Miles, R. N., and Hoy, R. R., 2016, "Airborne Acoustic Perception by a Jumping Spider," Curr. Biol., 26(21), pp. 2913-2920.

[66] de Bree, H.-E., 2003, "An Overview of Microflown Technologies," Acta Acust. Acust., 89(1), pp. 163-172.

[67] Leslie, C., Kendall, J., and Jones, J., 1956, "Hydrophone for Measuring Particle Velocity," J. Acoust. Soc. Am., 28(4), pp. 711-715.

[68] Karniadakis, G., Beskok, A., and Alum, N., 2005, Microflows and Nanoflows: Fundamentals and Simulation, Springer, New York, p. 123.

[69] Liou, W. W., and Fang, Y., 2006, Microfluid Mechanics: Principles and Modeling, McGraw-Hill Professional, New York.

[70] Nassios, J., and Sader, J. E., 2013, "High Frequency Oscillatory Flows in a Slightly Rarefied Gas According to the Boltzmann—BGK Equation," J. Fluid Mech., 729, pp. 1-46.

[71] Miles, R., and Bigelow, S., 1994, "Random Vibration of a Beam With a Stick-Slip End Condition," J. Sound Vib., 169(4), pp. 445-457.

[72] Blue Barn Fiber, 2017, "Stainless Steel Fiber," Blue Barn Fiber, Gooding, I D, accessed Aug. 14, 2017, www.bluebarnfiber.com/Stainless-Steel-Fiber_p_71,html 011009

[73] [5 J M, Dickinson M H (2001) Spanwise flow and the attachment of the leading-edge vortex on insect wings. Nature 412(6848):729-733.

[74] Atencia J, Beebe D J (2005) Controlled microfluidic interfaces. Nature 437(7059):648-655.

[75] Floreano D, Wood R J (2015) Science, technology and the future of small autonomous drones. Nature 521(7553): 460-466.

[76] Sterbing-D'Angelo S, et al. (2011) Bat wing sensors support flight control. Proc Natl Acad Sci USA 108(27): 11291-11296.

[77] Fuller S B, Straw A D, Peek M Y, Murray R M, Dickinson M H (2014) Flying *Drosophila* stabilize their vision-based velocity controller by sensing wind with their antennae. Proc Natl Acad Sci USA 111(13):E1182-E1191.

[78] Marusic I, Mathis R, Hutchins N (2010) Predictive model for wall-bounded turbulent flow. Science 329 (5988):193-196.

[79] Johnson J B, Lees J M, Gerst A, Sahagian D, Varley N (2008) Long-period earthquakes and co-eruptive dome inflation seen with particle image velocimetry. Nature 456(7220):377-381.

[80] Fratzl P, Barth F G (2009) Biomaterial systems for mechanosensing and actuation. Nature 462(7272):442-448.

[81] Barth F G, Humphrey J A C, Secomb T W (2002) Sensors and sensing in biology and engineering (Springer, New York).

[82] Bleckmann H, Mogdans J, Coombs S L (2014) Flow sensing in air and water (Springer, New York).

[83] Gopfert M C, Briegel H, Robert D (1999) Mosquito hearing: sound-induced antennal vibrations in male and female *Aedes aegypti*. J Exp Biol 202(20):2727-2738.

[84] Krijnen G J M, et al. (2006) MEMS based hair flow-sensors as model systems for acoustic perception studies. Nanotechnology 17(4):S84-89.

[85] McConney M E, et al. (2009) Biologically inspired design of hydrogel-capped hair sensors for enhanced underwater flow detection. Soft Matter 5(2):292-295.

[86] Asadnia M, et al. (2016) From biological cilia to artificial flow sensors: biomimetic soft polymer nanosensors with High Sensing Performance. Sci Rep 6:32955.

[87] Sarles S A, Madden J D W, Leo D J (2011) Hair cell inspired mechanotransduction with a gel-supported, artificial lipid membrane. Soft Matter 7(10):4644-4653.

[88] Maschmann M R, et al. (2014) Bioinspired carbon nanotube fuzzy fiber hair sensor for air-flow detection. Adv Mater 26(20):3230-3234.

[89] Walcott C, van der Kloot W G (1959) The physiology of the spider vibration receptor. J Exp Zool 141(2):191-244.

[90] Walcott C (1963) The effect of the web on vibration sensitivity in the spider, *Achaeranea tepidariorum* (Koch). J Exp Biol 40(4):593-611.

[91] Boys C V (1880) The influence of a tuning-fork on the garden spider. Nature 23:149-150.

[92] Vollrath F (1979) Vibrations: their signal function for a spider kleptoparasite. Science 205(4411):1149-1151.

[93] Masters W M, Markl H (1981) Vibration signal transmission in spider orb webs. Science 213(4505):363-365.

[94] Mortimer B, Holland C, Windmill J F, Vollrath F (2015) Unpicking the signal thread of the sector web spider *Zygiella* x-notata. J R Soc Interface 12(113), 20150633.

[95] Gosline J M, Guerette P A, Ortlepp C S, Savage K N (1999) The mechanical design of spider silks: from fibroin sequence to mechanical function. J Exp Biol 202(23): 3295-3303.

[96] Römer L, Scheibel T (2008) The elaborate structure of spider silk. Prion 2(4):154-161.

[97] Bauer J, Schroer A, Schwaiger R, Kraft 0 (2016) Approaching theoretical strength in glassy carbon nanolattices. Nat Mater 15(4):438-443.

[98] Zheng L X, et al. (2004) Ultralong single-wall carbon nanotubes. Nat Mater 3(10):673-676.

[99] Yaman M, et al. (2011) Arrays of indefinitely long uniform nanowires and nanotubes. Nat Mater 10(7):494-501.

[100] Wang X, Song J, Liu J, Wang Z L (2007) Direct-current nanogenerator driven by ultrasonic waves. Science 316(5821):102-10.

[101] Mei R (1996) Velocity fidelity of flow tracer particles. Exp Fluids 22(1):1-13.

[102] Jacobsen F (2002) A note on finite difference estimation of acoustic particle velocity. J Sound Vib 256(5):849-859.

[103] Ants, Wasps and Bees, Macaulay Library at the Cornell Lab of Ornithology (ML 125254).

[104] Bioacoustics research program. Raven Lite: interactive sound analysis software (Version 2.0). Ithaca, NY: The Cornell Lab of Ornithology (2016).

[105] Rees D W (2009) Mechanics of optimal structural design: minimum weight structures (Wiley, New York), pp 521-524.

[106] Wong E W, Sheehan P E, Lieber C M (1997) Nanobeam mechanics: elasticity, strength, and toughness of nanorods and nanotubes. Science 277(5334):1971-1975.

[107] Kim S H, Mulholland G W, Zachariah M R (2009) Density measurement of size selected multiwalled carbon nanotubes by mobility-mass characterization. Carbon 47(5):1297-1302.

[108] Zhou, Jian, and Ronald N. Miles. "Sensing fluctuating airflow with spider silk." Proceedings of the National Academy of Sciences (2017): 201710559, and SI www.pnas.org/cgi/content/short/1710559114.

US Patent and Pub. Patent Applications: U.S. Pat. Nos. 1,608,692; 1,892,645; 2,102,736; 4,072,821; 4,340,787; 4,947,437; 5,386,473; 5,553,147; 5,748,758; 6,285,769; 6,434,252; 6,625,587; 6,788,796; 6,832,518; 6,963,653; 7,072,475; 7,402,139; 7,430,297; 7,477,751; 7,502,481; 7,505,367; 7,580,762; 7,584,743; 7,674,602; 7,826,629; 7,894,619; 7,900,337; 8,009,843; 8,031,889; 8,031,898; 8,085,969; 8,086,284; 8,107,649; 8,121,691; 8,150,278; 8,218,795; 8,275,156; 8,275,157; 8,295,933; 8,331,588; 8,332,006; 8,345,894; 8,433,090; 8,442,243; 8,532,311; 8,565,453; 8,675,898; 8,731,186; 8,744,090; 8,817,951; 8,873,762; 8,948,421; 8,948,422; 8,983,079; 9,008,742; 9,025,797; 9,060,691; 9,075,572; 9,078,061; 9,113,238; 9,113,264; 9,167,327; 9,185,489; 9,195,740; 9,198,580; 9,210,508; 9,215,526; 9,280,884; 9,282,400; 9,288,599; 9,301,057; 9,306,519; 9,311,807; 9,329,715; 9,357,306; 9,369,802; 9,380,374; 9,392,363; 9,436,259; 9,442,496; 9,445,174; 20040244492; 20050196000; 20050263611; 20060045286; 20060045287; 20060078135; 20060078152; 20060103522; 20060192763; 20060222187; 20070086603; 20070092098; 20070161918; 20070197886; 20070223773;

20070253570; 20070269058; 20070274555; 20070293188; 20080002832; 20080018441; 20080078610; 20080085017; 20080152186; 20080161019; 20080198695; 20080207283; 20080219469; 20080300649; 20080300650; 20080300651; 20090116670; 20090141914; 20090154715; 20090154753; 20090190939; 20090208038; 20090208996; 20090221327; 20090245544; 20090262958; 20090264789; 20090279730; 20100280336; 20100290638; 20100296670; 20110038501; 20110064235; 20110158460; 20110188680; 20110194719; 20110261980; 20120063738; 20120087518; 20120121110; 20120150546; 20120189145; 20120203549; 20120230498; 20120263331; 20120269366; 20120288101; 20120295216; 20120300959; 20130044894; 20130080295; 20130091642; 20130111894; 20130118262; 20130123590; 20130123591; 20130188067; 20130201316; 20130226322; 20130226324; 20130287223; 20130293670; 20130297053; 20130297054; 20130304244; 20130325479; 20140037105; 20140077972; 20140105406; 20140113828; 20140247954; 20140254833; 20140258864; 20140270282; 20140328502; 20140341547; 20140348342; 20140362217; 20140369507; 20140376752; 20140379108; 20150016641; 20150030159; 20150036859; 20150043756; 20150055802; 20150063595; 20150073239; 20150094835; 20150098571; 20150104028; 20150110284; 20150124980; 20150131802; 20150139426; 20150156584; 20150163589; 20150186109; 20150208156; 20150215698; 20150217207; 20150230033; 20150245158; 20150253859; 20150271599; 20150277847; 20150296319; 20150302892; 20150304786; 20150310869; 20150312691; 20150317981; 20150319530; 20150319546; 20150324181; 20150326965; 20150332034; 20150334498; 20160007114; 20160044410; 20160048208; 20160061476; 20160061477; 20160061794; 20160061795; 20160063833; 20160063841; 20160063987; 20160066067; 20160066068; 20160073198; 20160077615; 20160085333; 20160086368; 20160086633; 20160093292; 20160105089; 20160111088; 20160119460; 20160119733; 20160125867; 20160148624; 20160155455; 20160182532; 20160191269; 20160198265; 20160219392; 20160253993; 20160255439; 20160286307; 20160295333; 20160299738; 20160302012; 20160316304; and 20160320231.

It is understood that this broad invention is not limited to the embodiments discussed herein, but rather is composed of the various combinations, subcombinations and permutations thereof of the elements disclosed herein, including aspects disclosed within the incorporated references. The invention is limited only by the following claims. Each claim is combinable with each other claim unless expressly inconsistent.

What is claimed is:

1. A metamaterial, comprising:

a plurality of flow sensors, each configured to sense a three dimensional vector flow state of a primary fluid wave in a medium and produce an electrical sensor signal in response;

a transducer, configured to emit a secondary fluid wave within the medium in response to an output, having a three dimensional vector flow state selectively dependent on the sensed three dimensional vector flow state of the primary fluid wave; and an automated control, configured to:

receive the electrical sensor signal from each of the plurality of flow sensors;

perform a time and space transform on the electrical sensor signal from each of the plurality of flow sensors with an automated transform processor to determine a three dimensional spatial flow pattern of the primary fluid wave and a scattering of the primary fluid wave by an element; and produce the output in accordance with a result of the time and space transform, to emit the secondary fluid wave which interferes with at least the scattering of the primary fluid wave.

2. The metamaterial according to claim 1, wherein the transducer comprises a phased array transducer having an emission pattern which does not direct the secondary fluid wave toward the plurality of fluid vector flow sensors.

3. The metamaterial according to claim 1, wherein the transducer has an emission pattern which emits the secondary fluid wave which is sensed by at least one of plurality of vector flow sensors.

4. The metamaterial according to claim 1, wherein the time and space transform approximates a metamaterial transfer function.

5. The metamaterial according to claim 1, wherein each respective flow sensor comprises at least one sensing fiber which is displaceable by viscous drag by wave movement of the medium and has a sensing fiber movement which corresponds to a wave movement of air over a range of at least 1-100 Hz.

6. The metamaterial according to claim 5, wherein each respective flow sensor comprises a set of three orthogonal sensing fibers.

7. The metamaterial according to claim 1, wherein the element comprises a core, and transducer is controlled to counteract an effect of the core on the primary fluid wave.

8. The metamaterial according to claim 1, wherein:

the plurality of fluid vector flow sensors surround the element; and the transducer comprises a transducer array configured to respond to a control signal to negate the interference of propagation of the primary fluid wave across the element.

9. The metamaterial according to claim 1, wherein each fluid flow sensor comprises a conductive fiber suspended in a magnetic field, configured to produce an electromagnetically induced voltage corresponding to a movement of the medium corresponding to the primary fluid wave.

10. A metamaterial method, comprising:

sensing a three dimensional vector flow state of a primary fluid wave in a medium with a plurality of flow sensors, each flow sensor producing an electrical sensor signal responsive to a flow state of the primary fluid wave;

performing a time and space transform on the electrical sensor signal from each of the plurality of flow sensors with an automated transform processor to determine a three dimensional spatial flow pattern of the primary fluid wave and a scattering of the primary fluid wave by an element; and emitting a secondary fluid wave within the medium having a three dimensional vector flow state selectively dependent on the time and space transform, which interferes with at least the scattering of the primary fluid wave.

11. The metamaterial method according to claim 10, wherein the transducer comprises a phased array transducer having an emission pattern which does not direct the secondary fluid wave toward the plurality of fluid vector flow sensors.

12. The metamaterial method according to claim 10, wherein the transducer comprises a phased array transducer having an emission pattern which emits the secondary fluid wave which is sensed by at least one of plurality of vector flow sensors.

13. The metamaterial method according to claim 10, wherein the time and space transform approximates a metamaterial transfer function.

14. The metamaterial method according to claim 10, wherein the medium comprises air, and each respective flow sensor comprises at least one sensing fiber which is displaceable by viscous drag by wave movement of the medium and has a sensing fiber movement which corresponds to a wave movement over a range of at least 1-100 Hz.

15. The metamaterial method according to claim 10, wherein the medium comprises air, and each respective flow sensor comprises at least one sensing fiber which is displaceable by viscous drag by wave movement of the medium and has a sensing fiber movement which corresponds to a wave movement over a range of at least 10 Hz to 10 kHz.

16. The metamaterial method according to claim 10, wherein each respective flow sensor comprises at least one sensing fiber which is displaceable by viscous drag by wave movement of the medium, and each respective flow sensor comprises a set of three orthogonal sensing fibers.

17. The metamaterial method according to claim 10, further comprising controlling the transducer to counteract an effect of the core on the primary fluid wave.

18. The metamaterial method according to claim 10, wherein:

the plurality of fluid vector flow sensors surround the element; and the transducer comprises a phased array transducer configured to respond to a control signal to negate the interference of propagation of the primary fluid wave across the element.

19. The metamaterial method according to claim 10, wherein each fluid flow sensor comprises a conductive fiber suspended in a magnetic field, further comprising producing an electromagnetically induced voltage corresponding to a movement of the conductive fiber in the magnetic field due to waves in the medium corresponding to the primary fluid wave.

20. A metamaterial, comprising:

a flow sensor array, configured to sense a three dimensional vector flow state of a primary fluid wave in a medium and produce an electrical sensor signal in response;

a scattering element configured to interact with the primary fluid wave in the medium;

a transducer array responsive to a drive signal, configured to emit a secondary fluid wave within the medium having a three dimensional vector flow state selectively dependent on the sensed three dimensional vector flow state of the primary fluid wave to interfere with scattering by the scattering element; and an automated transform processor, configured to perform a time and space transform on the electrical sensor signal, to determine a three dimensional spatial flow pattern of the primary fluid wave and a scattering of the primary fluid wave by the scattering element, and produce the drive signal based on the time and space transform.

21. The metamaterial according to claim 20, wherein the time and space transform approximates a metamaterial transfer function.

* * * * *